United States Patent
Adamides

[11] Patent Number: 5,727,388
[45] Date of Patent: *Mar. 17, 1998

[54] SOLAR ACTIVATED POSITIVE DISPLACEMENT PISTON PUMP-ROTOR DRUM TURBINE

[76] Inventor: Alexander Adamides, 834 11th St. N., St. Petersburg, Fla. 33705

[*] Notice: The term of this patent shall not extend beyond the expiration date of Pat. No. 5,271,225.

[21] Appl. No.: 171,570

[22] Filed: Dec. 21, 1993

Related U.S. Application Data

[63] Continuation-in-part of Ser. No. 878,818, May 5, 1992, Pat. No. 5,271,225, which is a continuation-in-part of Ser. No. 519,768, May 7, 1990, abandoned.

[51] Int. Cl.$^6$ .................................................. F16D 31/02
[52] U.S. Cl. .............................. 60/417; 60/413; 417/418; 310/24; 310/35
[58] Field of Search ............................ 60/413, 415, 417; 417/417, 418, 237; 310/24, 34, 35; 192/66.1, 66.3, 70.11

[56] References Cited

U.S. PATENT DOCUMENTS

| | | | |
|---|---|---|---|
| 1,572,126 | 2/1926 | Bothner | 417/418 |
| 1,804,375 | 5/1931 | Cobe | 417/418 |
| 1,804,376 | 5/1931 | Cobe | 417/418 |
| 2,279,008 | 4/1942 | Nathan | 60/328 |
| 2,443,344 | 6/1948 | Ekleberry | 417/418 X |
| 2,515,110 | 7/1950 | Bornstein | 417/418 |
| 2,578,902 | 12/1951 | Smith | 417/418 |
| 2,701,331 | 2/1955 | Holst | 417/418 X |
| 3,085,667 | 4/1963 | Lang | 192/66.3 |
| 3,379,008 | 4/1968 | Manganaro | 60/412 X |
| 3,492,819 | 2/1970 | Waltrip | 60/409 X |
| 3,556,272 | 1/1971 | Jones | 192/88 A X |
| 3,740,171 | 6/1973 | Farkos | 417/418 |
| 3,754,154 | 8/1973 | Massie | 310/34 X |
| 3,828,880 | 8/1974 | Smith | 60/412 X |
| 4,043,126 | 8/1977 | Santos | 60/407 |
| 4,060,987 | 12/1977 | Fisch et al. | 60/409 |
| 4,086,764 | 5/1978 | Brown et al. | 60/325 |
| 4,272,226 | 6/1981 | Osborne | 417/418 |
| 4,375,941 | 3/1983 | Child | 417/418 X |
| 5,106,274 | 4/1992 | Holtzapple | 417/418 X |
| 5,203,172 | 4/1993 | Simpson et al. | 417/418 X |

*Primary Examiner*—F. Daniel Lopez

[57] ABSTRACT

An apparatus powered by solar cell photon energy having a motor for rotating a drive shaft by the use of compressed air. The motor comprising: a housing having a circular cross section with a drive shaft extending therethrough; a rotor having concave cups on its exterior surface mounted on the drive shaft within the housing; ports extending through the housing to cause rotation of the rotor; a plurality of sources of compressed air positioned adjacent to the housing. The apparatus further includes an alternator and/or a system for converting solar energy into mechanical energy comprising a battery chargeable through solar panels to generate power for reciprocating pistons to thereby generate the compressed air. Finally, the apparatus includes a compressor for generating electrical current and compressed air comprising; a cylindrical housing and magnet having a circular cross section and opposed parallel planar faces; resilient members coupled at their external ends to the faces of the housing and at their internal ends to the faces of the magnet; a primary wire adapted to initiate reciprocation of the magnet, the primary wire being coupled to a source of potential and wound with opposite ends adjacent to the faces of the housing for being intersected by the ends of the magnet when reciprocating; and a secondary wire wound oppositely from the primary wire with opposite ends adjacent to the faces of the housing for being intersected by the ends of the magnet when reciprocating for thereby generating current for use.

15 Claims, 16 Drawing Sheets

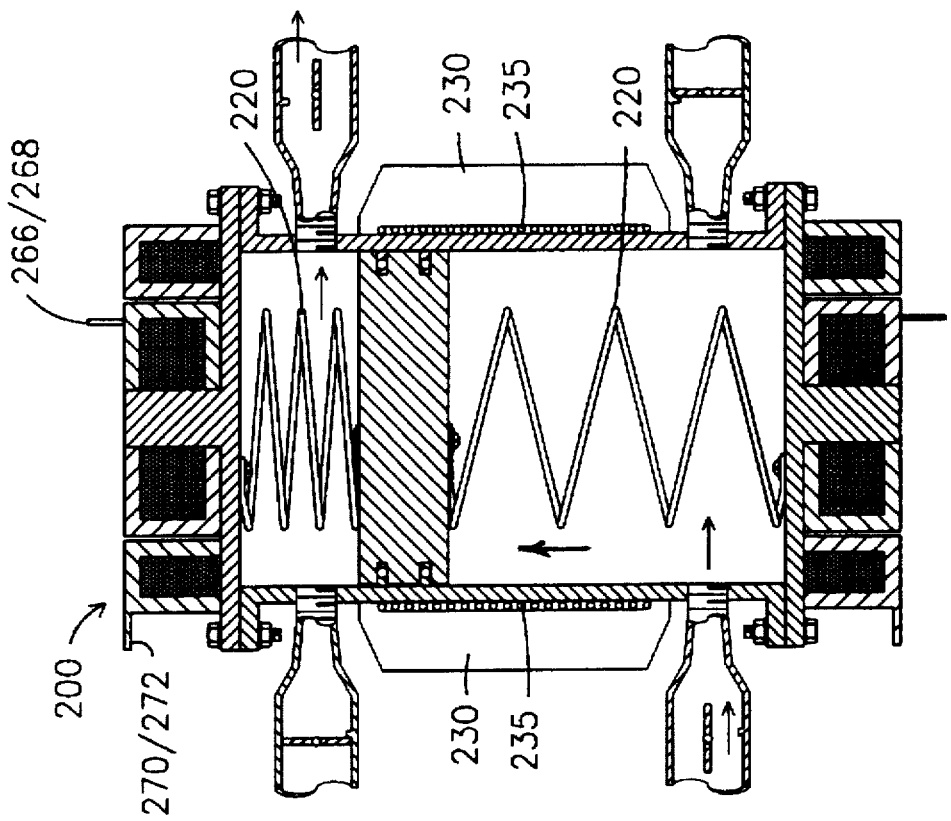
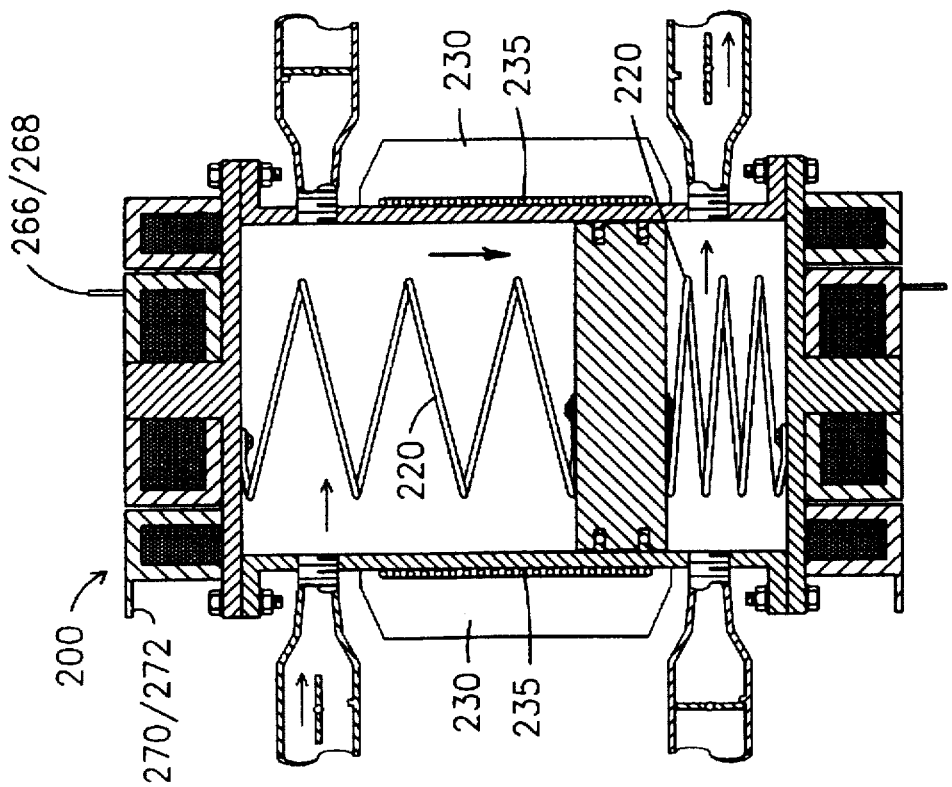

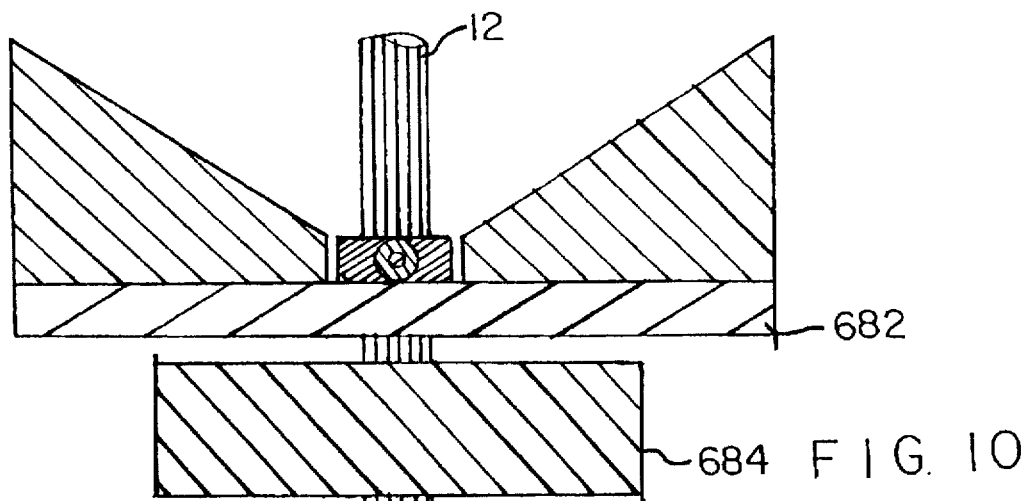
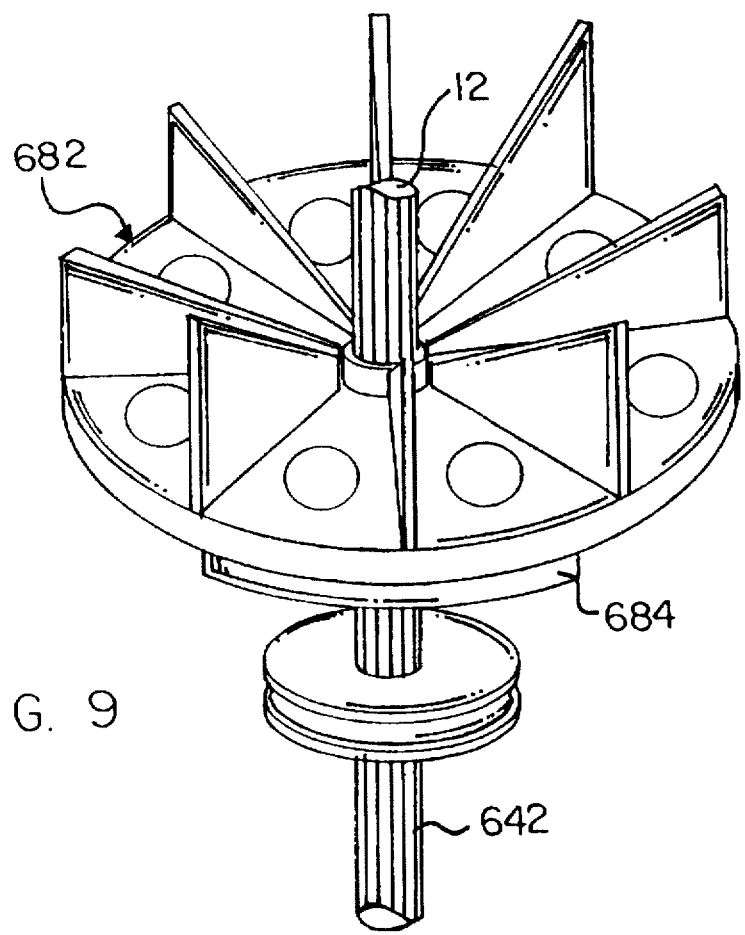
FIG. 10
FIG. 9

SOLAR ACTIVATED POSITIVE DISPLACEMENT PISTON PUMP-ROTOR DRUM TURBINE

This application is a continuation-in-part application of U.S. patent application Ser. No. 07/878,818 filed May 5, 1992, which is U.S. Pat. No. 5,271,225, and which in turn is a continuation-in-part application of U.S. patent application Ser. No. 07/519,768 filed May 7, 1990, now abandoned.

BACKGROUND OF THE INVENTION

1. Field of the Invention

The present invention relates to an improved apparatus for propelling vehicles and generating electrical energy, and, more particularly, to an apparatus that can propel a vehicle and generate electricity on land and water, and through air and outer space.

2. Description of the Background Art

During the past century and a half, various methods of vehicular propulsion and electrical generation have been employed. These methods employed gas, oil, coal, alcohol, ethanol, methanol, water, steam, electricity, nuclear energy, etc. for a power source.

By way of example, internal combustion engines powered by gasoline or diesel fuel have been utilized to propel a variety of vehicles. Recently, attempts have been made to propel vehicles having internal combustion engines using a fuel source of alcohol, ethanol or some combination of alcohol, ethanol and gasoline. This is exemplified by Ford Motor Corporation's current efforts to promote methanol as an efficient, nonpolluting power source. Steam has been used as a power source for propelling cars, but has met with little success.

Additionally, attempts to power vehicles by electrical power sources date back to the turn of the 20th century. However, the incapacity of electrical batteries to store adequate amounts of electricity combined with the drain placed on the battery's by DC and AC motors impeded the development of electric vehicles. In spite of recent advances by the major automotive manufacturers, under the impetus of the U.S. Department of Energy, electrically powered vehicles remain impractical. Furthermore, recent research and experimentation with solar cells has taught the combination of silicon, gallium arsenide and antimonide for forming an improved cells has not made electrically powered vehicles competitive with conventionally powered vehicles. The challenge of designing and manufacturing a vehicle that is powered by a non-polluting power source and capable of traveling at an acceptable speed for an extended range has not been met.

The generation of electrical power by conventional means yields harmful waste products. Utility and industrial plants continue to use fossil fuels and nuclear energy to generate electricity. Nuclear energy, as well as conventional fossil fuels, presents hazards to the environment and all living species. Current technology, a throwback to the 19th century, not only pollutes the air with toxins, such as particulates, sulfur dioxide, carbon monoxide, nitrogen dioxide, ozone and lead, but also exhausts fresh water resources at an enormous rate. Furthermore, pollutants resulting from the use of fossil fuels combine with fresh water to form acid rain, thereby curtailing the natural processes that regenerate fresh water supplies.

The argument being propounded by the Nuclear Regulatory Commission and proponents of nuclear power that the best way to combat the "greenhouse effect" and "ozone depletion" resulting from the utilization of fossil fuels is to construct more nuclear reactor plants represents a prime example of the fallacious presuppositions of 20th century U.S. technology.

Nuclear energy produces radioactive elements such as plutonium. Plutonium is permanently toxic and is almost impossible to dispose of in a safe manner. The use of nuclear energy for the generation of electricity/results in water and air being heated to extreme temperatures. The extreme temperatures disturb the balance of nature in a multitude of ways. The natural habitats of animals are affected by increases in mean temperatures resulting from cooling water discharges into streams and rivers. Additionally, workers, technicians, engineers, scientists, etc. are succumbing to cancer due to constant exposure to radiation in the atmosphere of the workplace. Furthermore, nuclear reactor plants for the generation of electricity take between 10 to 15 years to construct, but only have an estimated life expectancy of 30 years despite high initial construction costs and large maintenance costs. Finally, the nuclear accidents at Chernobyl in 1986 and Three Mile Island in 1983 illustrate the ever present possibility of harm to everyone living in close proximity to a nuclear power plant.

As illustrated by the background art, efforts are continuously being made in an attempt to propel vehicles and generate electrical power. No prior effort, however, provides the benefits attendant with the present invention. Additionally, the commercial techniques do not suggest the present inventive combination of component elements arranged and configured as disclosed and claimed herein.

The present invention achieves its intended purposes, objects, and advantages through a new, useful and unobvious combination of component elements, with the use of a minimum number of functioning parts, at a reasonable cost to manufacture, and by employing only readily available materials.

Therefore, it is an object of this invention to provide a nonpolluting, self-contained, automatically monitored power producing apparatus powered by solar cell photon energy having a motor for rotating a drive shaft by the use of compressed air. The motor comprising: a motor housing having a circular cross section with a drive shaft extending therethrough, the axis of the housing and the axis of the drive shaft being coextensive; a rotor mounted on the drive shaft within the housing, the rotor having concave cups therein on its exterior surface along the length thereof; ports extending through the housing at an angle with respect to the axis to effect a flow of air from exterior to the cups to cause rotation of the rotor and, consequently, the rotation of the shaft with respect to the housing; a plurality of sources of compressed air positioned adjacent to the housing; and lines coupling the ports with the sources of compressed air for the two way flow of air between the ports and the sources.

The apparatus further includes an alternator and/or a system for converting solar energy into mechanical energy comprising a battery chargeable through solar panels to generate power for reciprocating magnets to thereby generate the compressed air.

Finally, the apparatus includes a pump for generating electrical current and compressed air comprising: a cylindrical pump housing having a circular cross section and opposed parallel planar faces; a cylindrical magnet with a circular cross section and opposed parallel planar faces, the axes of the housing and the magnet being coextensive; resilient members coupled at their external ends to the faces of the housing and at their internal ends to the faces of the magnet; a primary wire adapted to initiate reciprocation of the magnet within the housing; the primary wire being coupled to a source of potential electrical energy and wound with opposite ends adjacent to the faces of the housing for being intersected by the ends of the magnet when reciprocating and a secondary wire wound oppositely from the primary wire with opposite ends adjacent to the faces of the housing for being intersected by the ends of the magnet when reciprocating for thereby generating current for use.

Another object of this invention is to create a positive displacement piston pump and a motor for generating electrical power in a manner that is totally nonpolluting, nontoxic and nonevaporative.

A further object of this invention is to eliminate cooling systems by reducing friction and heat gain in vehicular propulsion systems and electrical power generation systems.

A further object of this invention is to provide an apparatus to propel vehicles and generate electrical power for preserving and protecting essential fresh water resources.

A further object of this invention is to provide an apparatus to propel vehicles and generate electrical power having simplicity of design and a minimal number of moving parts to alleviate the need for constant maintenance and frequent repairs to the apparatus, thereby resulting in greater energy efficiency and significant cost reduction.

A further object of this invention is to provide a power source apparatus which is self-contained, self-replenishing to enable batteries and other means of storage to be recharged on a constant and regular basis.

A further object of this invention is to provide an improved power plant which obviates the disadvantages and inadequacies of known power plant systems.

A further object of this invention is to provide an improved, highly efficient power plant which will run for long periods of time with solar powered light and/or batteries and alternators.

A further object of this invention is to provide an extremely efficient power plant to replace a conventional internal combustion engine having a conventional ignition system, carburetor, fossil fuel power source, transmission, etc. by providing a nonpolluting apparatus to propel vehicles and generate electrical power.

A further object of this invention is to provide a simple, efficient, light-weight high powered propulsion system for many vehicles and other application by eliminating a conventional cooling system and exhaust fumes normally found in association with internal combustion engines, while providing flexibility and reliability thereof.

A further object of this invention is to provide an apparatus for use in vehicular propulsion systems and electrical power generation systems that does not use fossil fuels as a power source.

A further object of this invention is to provide an apparatus for use in vehicular propulsion systems having computerized dash mounted controls for indicating which parts of the apparatus require servicing.

A further object of this invention is to provide an apparatus for use in vehicular propulsion systems having a computerized display which will function regardless of whether the vehicle is stationary or moving.

The foregoing has outlined some of the more pertinent objects of this invention. These objects should be construed to be merely illustrative of some of the more prominent features and applications of the present invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

The invention is defined by the appended claims with the specific embodiment shown in the attached drawings. For the purpose of summarizing the invention, the invention may be incorporated in a nonpolluting, self-contained, automatically monitored power producing apparatus powered by solar cell photon energy. The apparatus having a motor for rotating a drive shaft by the use of compressed air. The motor comprising a motor housing having a circular cross section with a drive shaft extending therethrough, the axis of the housing and the axis of the drive shaft being coextensive. Further, the motor has a rotor mounted on the drive shaft within the housing, the rotor having concave cups therein on its exterior surface along the length thereof. The motor has ports extending through the housing at an angle with respect to the axis to effect a flow of air from exterior to the cups to cause rotation of the rotor and, consequently, the rotation of the shaft with respect to the housing. The motor further includes a plurality of sources of compressed air positioned adjacent to the housing and lines coupling the ports with the sources of compressed air for the two way flow of air between the ports and the sources.

Additionally, the apparatus further includes a system for converting solar energy into mechanical energy. The system comprises a battery chargeable through solar panels and/or an alternator to generate power for reciprocating magnets to thereby generate the compressed air.

Finally, the apparatus includes a pump for generating electrical current and compressed air comprising a cylindrical pump housing having a circular cross section and opposed parallel planar faces. The pump further includes a cylindrical magnet having a circular cross section and opposed parallel planar faces, the axes of the housing and the magnet being coextensive. Resilient members are coupled at their external ends to the faces of the housing and at their internal ends to the faces of the magnet. A primary wire is adapted to initiate reciprocation of the magnet within the housing, the primary wire being coupled to a source of potential electrical energy and wound with opposite ends adjacent to the faces of the housing for being intersected by the ends of the magnet when reciprocating. Finally, a secondary wire is wound oppositely from the primary wire with opposite ends adjacent to the faces of the housing for being intersected by the ends of the magnet when reciprocating for thereby generating current for use.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present invention. It should be realized by those skilled in the art that such equivalent methods and structures do not depart from the spirit and scope of the invention as set forth in the appended claims.

BRIEF DESCRIPTION OF THE DRAWINGS

For a fuller understanding of the nature and objects of the present invention, reference should be had to the following detailed description taken in conjunction with the accompanying drawings in which:

FIGS. 8A and 8B are views similar to FIG. 8 but illustrating an alternate embodiment of the invention.

FIG. 9 is a perspective view of the flywheel.

FIG. 10 is a vertical section through the flywheel.

Similar reference characters refer to similar parts throughout the several figures.

DESCRIPTION OF THE PREFERRED EMBODIMENT

Figure 1:
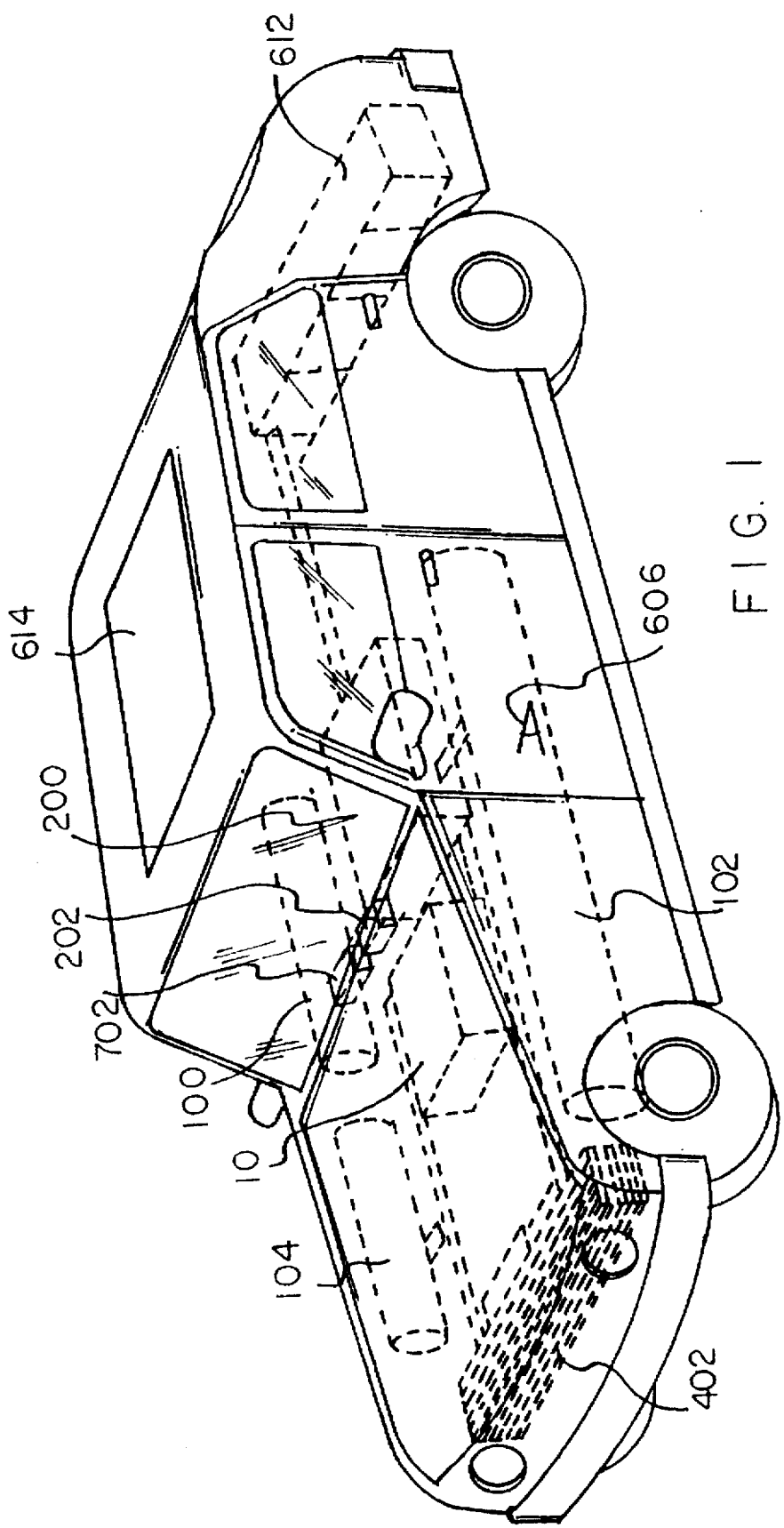
FIG. 1 is a perspective of the invention as applied to vehicular propulsion system.

Shown in FIGS. 1 through 14 are various views of the primary embodiment of the apparatus for propelling vehicles.
Overview From an overview standpoint, the invention may be described as a nonpolluting, self-contained, automatically monitored power producing apparatus system to power vehicles and powered by solar cell photon energy having a motor 10 for rotating a drive shaft 12 by the use of compressed air. The system comprises a motor 10 having a housing 14 containing a rotor 16 with a drive shaft 12 extending therethrough and concave cups 18 therein surface 40 along the length thereof. Additionally, the motor has ports 62 extending through the housing to effect a flow of air from exterior to the cups to cause rotation of the rotor and, consequently, the rotation of the shaft with respect to the housing. The motor further includes a plurality of sources of compressed air tanks 100, 102, 104. The motor may further include a torque convertor 640.

The apparatus further includes an alternator 610 and/or a system 618 for converting solar energy into mechanical energy. The system comprises a battery 612 chargeable through solar panels 614 and/or an alternator 610 and a spare battery 613 for generating power and breaking for reciprocating a magnet 210 to thereby generate compressed air.

Finally, the apparatus includes a pump 200 for generating electrical current. The pump 200 comprises a cylindrical pump housing 202 having a circular cross section and opposed parallel planar faces 218 and 246. Contained within the housing 202 is a cylindrical magnet 210 having a circular cross section and opposed parallel planar faces 212 and 214. Furthermore, resilient members 220 are coupled at their external ends 222 to end plates 216 and 248 at their internal ends 224 to the faces 212 and 214 of the magnet 210. A primary wire 232 is adapted to initiate reciprocation of the magnet 210 within the housing 202. The primary wire 232 is coupled to a source of potential electrical energy, battery 612 and wound with opposite ends 266 and 268 adjacent to the faces 218 and 246 of the housing for being intersected by the faces 212 and 214 of the magnet 210 when reciprocating. Finally, a secondary wire 234 is wound oppositely from the primary wire 232 with opposite ends 270 and 272 adjacent to the faces 246 and 218 of the housing 202 for being intersected by the faces 212 and 214 of the magnet when reciprocating for thereby generating current for use.

Figure 2:
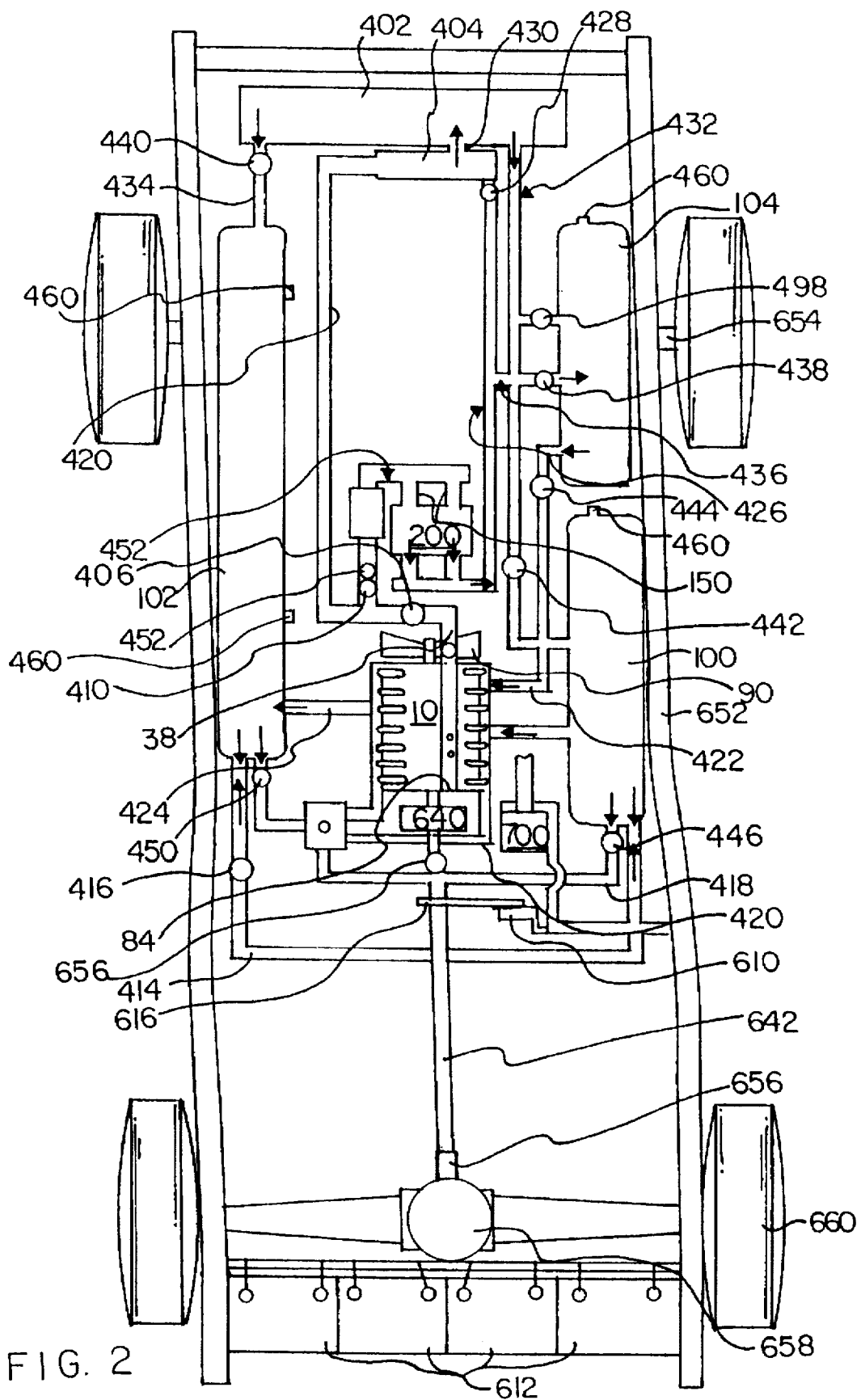
FIG. 2 is an plan view of the invention installed in a chassis of a vehicle.

FIGS. 1 and 2 show the preferred embodiment of the invention in combination with a land vehicle comprising solar panels 614, a conventional chassis 651, wheels and front suspension 654. The vehicle's drive train includes a torque convertor 640 (See FIG. 3), a supplemental shaft 642 having universal joints 656 on each end thereof and a differential drive gear 658 to the rear wheels 660. Also shown is the motor 10 and related components coupled to the chassis 651. The figures further illustrate air pressure storage tanks 100, 102, 104, cooling coil 402, master computer 700, and a computer read-out screen 702.

The Motor

More specifically, the apparatus includes a motor 10 for rotating a drive shaft 12 by the use of compressed air or fluids. In the preferred embodiment, compressed air is used to rotate the drive shaft 12. Essentially, the motor 10 comprises a motor housing 14 with a drive shaft 12 extending therethrough, a rotor 16 having concave cups 18 thereon, ports 62 extending through the housing 14, a plurality of sources of compressed air 100, 102, 104 and a system of lines coupling the ports and sources of compressed air. Alternately the motor may include a torque convertor 640.
The Motor Housing The motor 10 comprises a motor housing 14 having a circular cross-section with a drive shaft 12 extending therethrough. Additionally the housing has disk shaped end plates 20 coupled thereto. The axis 22 of the motor housing 14 and the axis 22 of the drive shaft 12 are coextensive. The turbine cylinder or housing 14 is constructed of a strong light weight material, such as a graphite compound. Furthermore, a plurality of cooling fins 24 extend longitudinally along the exterior of the motor housing 14 and are integral with the housing 14. In addition to being used for cooling, the fins 24 are used to couple the end plates 20 and the motor housing 14.

The end plates 20 are tapered along their circumference to cooperate with a corresponding surface 26 of the motor housing 14. The end plates 20 are pulled inwardly toward the motor housing 14 by a flange 28 having a gasket 30 and fasteners 32 therethrough extending into the fins 24.

A slot shaped opening 34 extends longitudinally along the motor housing 14 between each end plate 20 and a spacer 36. The openings give an unimpeded flow of exhaust air into an exhaust manifold 38.

The Rotor

The motor 10 further comprises a rotor 16 mounted on the drive shaft 12 within the motor housing 14. The rotor 16 has concave cups 18 therein on its exterior surface 40 along the length thereof.

In other words, the motor 10 comprises a motor housing 14 in which a rotor 16 revolves. Through the center longitudinal axis 22 of the motor housing 14 is a drive shaft 12 that may be mounted within sealed bearings 42. The bearings 42 are immersed in oil from a pump (not shown) contained within the end plates 20. The rotor 16 comprises two identically shaped cylinders 44 and 46, each cylinder having an open end 48 and a closed end 50. Each cylinder 44 and 46 is rotatable about the drive shaft 12 independently of the other cylinder. The cylinders 44 and 46 are constructed of a strong, light-weight material, such as a graphite compound, duralumin or steel.

Further, a spacer 36 is located between the cylinders 44 and 46. The spacer 36 is essentially a disk having the same diameter as the cylinders 44 and 46. The spacer is coupled to the drive shaft 12. Around the circumference of the spacer 36 is a groove 52 for receiving an O-ring 54. The O-ring 54 forms a seal between the spacer 36 and the interior surface 56 of the motor housing 14. The O-ring 54 is made of low friction material such as teflon.

Additionally, about the circumferential surface 40 of the rotor 16 are longitudinal rows of concave cups 18 equally spaced. The concave cups 18 on the exterior surface 40 along the length of the rotor 16 receive air pressure to turn the rotor 16. The outer rotor surface 40 and concave cups 18 are coated with a low friction material, such as teflon. Further, the motor housing's interior wall surface 56 is coated with a low friction material such as teflon. After the storage tanks 100, 102, 104 are full, they are ready to actuate the rotor 16.

Furthermore, the rotor 16 has a plurality of holes 58 bored through it longitudinally. The holes 58 are equally spaced and equal distance about its longitudinal axis 22 to reduce the rotor's weight and to allow air flow through the rotor for cooling. A space or gap 60 between the rotor 16 and end plates 20 will allows air to circulate through the holes 58. The rotor 16 is dynamically balanced on the shaft 12 before the motor is assembled.

The Ports

A plurality of ports 62 extend through the housing 14 at an angle with respect to the axis 22 of the housing 14 and shaft 12 to effect a flow of air from exterior to the cups 18 to cause rotation of the rotor 16 and drive shaft 12 with respect to the motor housing 14. Furthermore, the ports 62 may include injector nozzles 64. The nozzles 64 have different size orifices 66 at the end 68 of each nozzle to drive the turbine shaft 12 for propulsion. Furthermore, each injector nozzle 64 has a one-way check valve 70 to allow pressure to go into the cup 18.

The ports 62 are drilled through the fins 24 and motor housing 14 at such an angle so as to exert air pressure most effectively against the concave cups 18. There is one injection port 62 for each circle of concave cups 18. The nozzles 64 are fastened to a cooling fin 24 at one end 68 and an air pressure manifold 74, 80 and 82 at the other end by tubing connectors 78.

Air pressure manifolds 74, 80, 82 run longitudinally along the motor housing 14. The manifolds are mounted to the cooling fins 24. One injector manifold 74 is for high pressure forward and is used in conjunction with low pressure forward manifold 80 to initially move the vehicle from a stopped position. The high pressure manifold 74 is also used for accelerating the vehicle as needed, such as during passing maneuvers and hill climbing. The low pressure forward manifold 80 is used for normal operation after the acceleration requirement has terminated. A third manifold 82 is for providing a low pressure reverse. The third manifold 82 is used to direct pressure against the forward rotation of the rotor 16 which will slow or stop the rotor. The low pressure reverse air flow can also move the vehicle in a rearward direction.

Back pressure builds in the motor housing 14 as the rotor 16 rotates. Motor housing 14 back pressure is relieved through an exhaust manifold 38. The exhaust manifold 38 is a large tube closed on one end 84. The manifold 38 further has an open end 86 connected to the pump intake manifold 150 by intake lines 452. Further, the exhaust manifold is connected to the expansion chamber 404 by expansion lines 470. Furthermore, air pressure depletes in the storage tanks 100, 102, and 104 as the motor 10 is in operation. At a predetermined pressure within the tanks the master computer 700 starts the pump 200. Additionally, if the master computer 700 senses rotor 16 stalling, the computer 700 starts the pump 200 and slowly opens a flow modulating one way valve 410. As the motor operates, exhaust air from the motor housing 14 is drawn through pump intake manifold 150.

There is a filter 91 in the motor exhaust manifold 38 that removes particles and moisture from the air flow before going into the pump 200. If the pump is not in operation the master computer 700 will route the pressure in the motor housing 14 to the low pressure tanks 100 and 102 through an expansion chamber 404 and cooling coil 402. If back pressure in the motor housing 14 becomes too great, a pressure relief valve 406 in the exhaust manifold 38 opens, thereby dumping exhaust pressure to ambient for controlling the exhaust flow from the motor housing 14 to the pump 200. The flow modulating one way valve 410 is controlled by the master computer 700.

An alternate source of intake air for the pump 200 is through an ambient air intake solenoid valve 412. The valve is controlled by the master computer 700. When air pressure is depleted from the low pressure tank 100, the master computer 700 transfers pressure from the accumulator tank 102 to the low pressure tank 100 through a cross-over line 414 through a solenoid on/off one way valve 416.

Figure 6A:
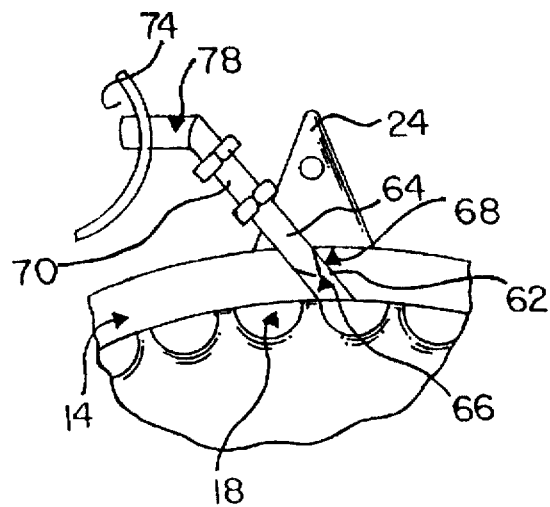
FIG. 6A is an enlarged showing of one nozzle.
Figure 6:
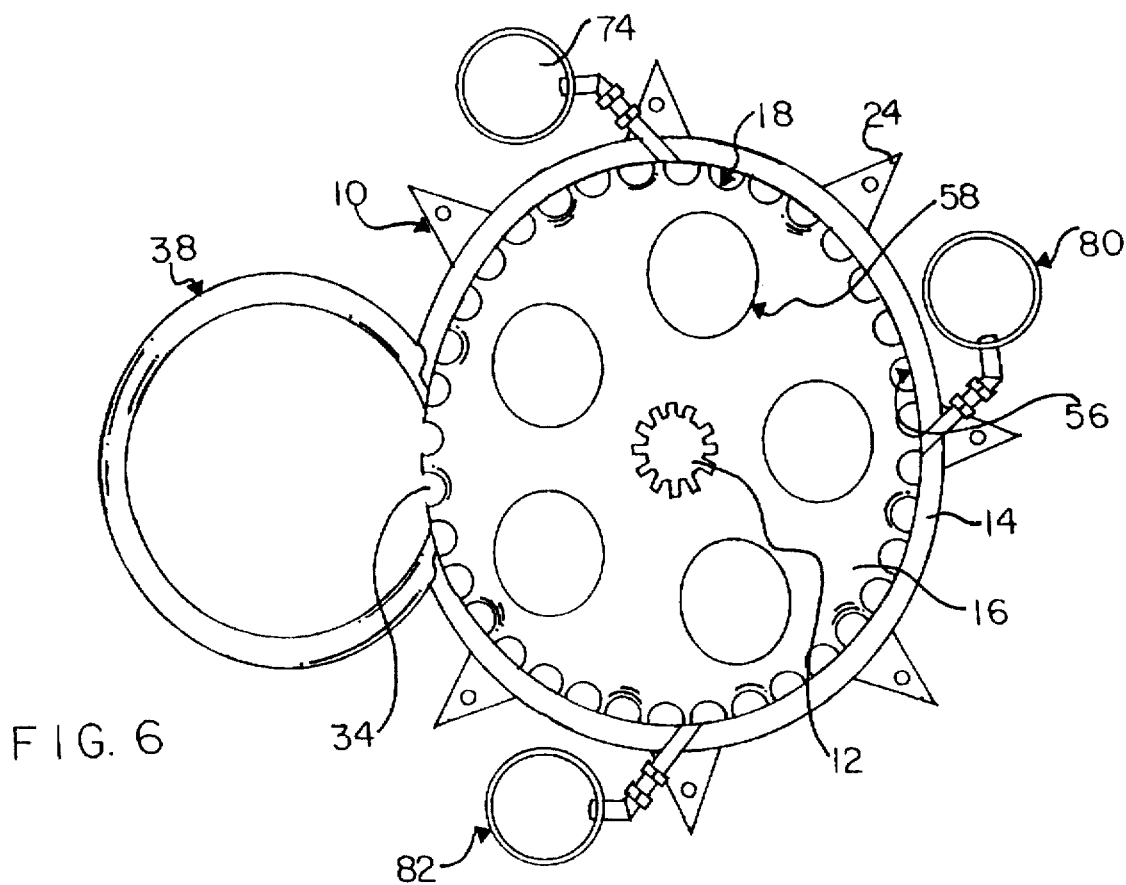
FIG. 6 is a vertical section through the motor housing showing an enlargement of the nozzles.
Figure 6B:
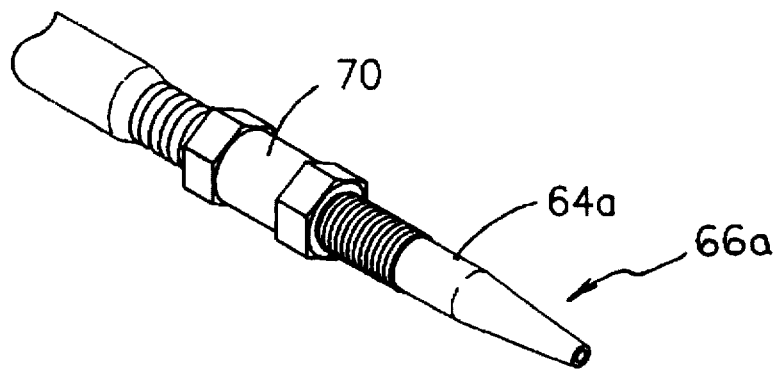
FIGS. 6B, 6C, and 6D are enlarged showings of nozzles constructed in accordance with alternate embodiments of the invention.
Figure 6C:
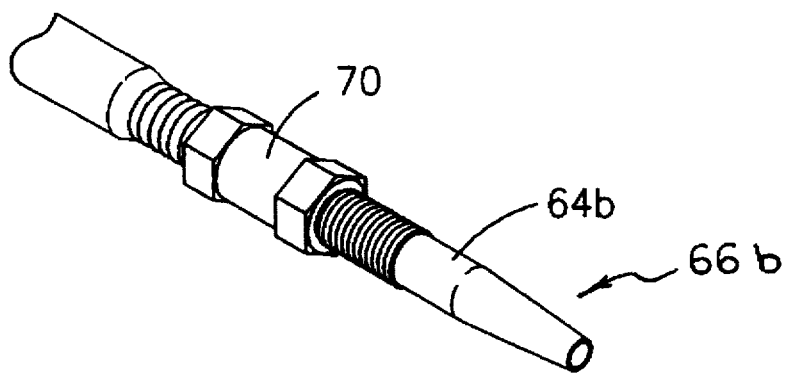
Figure 6D:
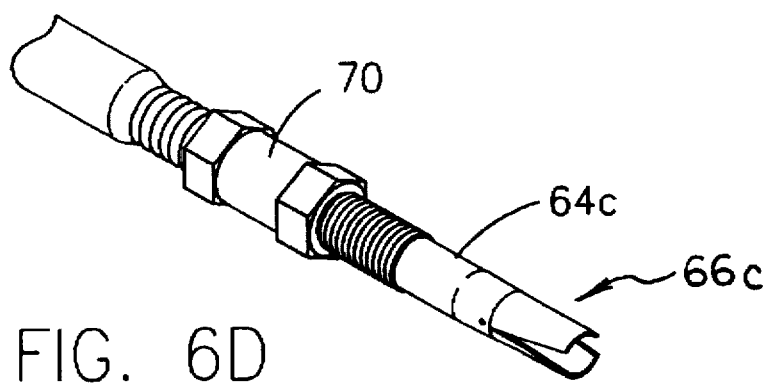

An alternate embodiment of this invention is disclosed in FIGS. 6B, 6C and 6D. In FIGS. 6B and 6C, two different nozzles 64A and 64B are disclosed with tips 66A and 66B. Such nozzles are essentially the same as that disclosed in the primary embodiment of FIGS. 6 and 6A. In such alternate embodiment, the nozzles are provided with external threads at their input ends. Such threads are adapted to be releasably coupled to internal threads of a recipient tube. In this manner, one nozzle with a large opening may be substituted for another nozzle with a small opening. Consequently, the differently orifices of these various nozzles may be interchanged for effecting different operating characteristics of the system. In the embodiment shown in FIG. 6D, the nozzle 64C is provided with tip 66C and with threads at its input end but its output end is an orifice of variable size. The size of the orifice of the nozzle may be varied under the control of the operator for varying the operating characteristics during use of the system without having to interchange one fixed nozzle for another fixed nozzle.

The Air Tanks

Generally, the motor 10 further comprises a plurality of sources of compressed air tanks 100, 102, and 104. The sources of compressed air include a high pressure source tank 104, a low pressure source tank 100 and an accumulator tank 102. There are lines 418 and 420 connecting the low pressure source tank 100 and the ports 62. Additionally, there is a high pressure line 422 connecting the high pressure source tank 104 and the ports 62. Furthermore, the line 424 with a pressure equalization valve accepts flow from the motor housing 14 to the accumulator tank 102 during deceleration. The sources of low pressure air 100, high pressure air 104 and the accumulator 102 may be simple tanks.

More specifically, as the pump 200 begins operation, air pressure is routed from the pump 200 through lines 426 to an expansion chamber valve 428. The valve 428 is energized by the master computer 700 to allow air to enter an expansion chamber 404 for cooling. Thereafter, the air is routed through the line 430 into a the cooling coil 402 for further cooling. The cooled air is routed through line 432 and valves 498 and 442 and line 434 from the cooling coil 402 to the low pressure tank 100 and high pressure tank 104 and through line 434 and valve 440 to the accumulator tank 102. The line 436 between the line 432 and the high pressure tank 104 contains a solenoid valve 438. The valve 438 allows air to enter into the high pressure storage tank 104. The high pressure tank 104 is filled prior to filling the low pressure tank 100 and accumulator tank 102 because of starting and accelerating requirements placed on the high pressure reserve. When the low pressure tank 100, the accumulator tank 102 and the high pressure tank 104 reach their respective operating pressures, tank sensors 460 signal the master computer 700 to send signals to close the solenoid and output valves 442, 440, 438 and 498. Simultaneously, the computer 700 sends a signal to stop the operation of the pump 200.

The Torque Convertor

The motor 10 may further include a torque convertor 640 operatively resembling a fluid clutch. The torque convertor 640 couples the drive shaft 12 with a supplemental shaft 642 mounted coaxially with the drive shaft 12. The energizing of the torque converter 640 can be effected by air, gas or liquid. The torque convertor is formed by two convertor cylinders 644 and 646. Each cylinder 644 and 646 has an open end 648 and a closed end 650. Fasteners 652 couple the cylinders 644 and 646 at their open ends 648. Cooling vents 653 are located peripherally along the circumference at the open end 648 of each cylinder 644 and 646. Furthermore, each cylinder has a tube 657 extending partially therethrough. The convertor axis 659 of the tube 657 and cylinders 644 and 646 are coextensive. The tube 657 accepts the drive shaft 12 in the first cylinder 644 and the supplemental shaft 642 in the second cylinder 646. A top disk 666 and bottom disk 668 are slidably coupled to the drive shaft 12 and supplemental shaft 642. Further, another or third disk 661 has a metallic fibre material deposited on both faces 662 and 664 thereof is positioned between the slidable disks 666 and 668.

Additionally, a sealed expandable diaphragm 670 within each cylinder 644 and 646 between the slidable disk 666 and 668 and the closed end 650 of the cylinder is positioned on each side of the cylinders 644 and 646. The diaphragm 670 may be expanded or closed by air, gas or liquid pressure. There is a feed line 672 to each expandable diaphragm 670. Alternately, each disk 666 and 668 has O-rings 690 coupled thereto for forming a seal between the disks 666 and 668 and cylinder 644 and 646. Each line 672 goes to a sensor 674 for sending information to the master computer 700. A modulating valve 676 within each line 672 controlled by the master computer 700 directs the pressure to each sealed expandable diaphragm 670. When the diaphragms 670 are expanded, the back sides 678 and 680 of disks 666 and 668 engages the diaphragm 670 moving both disks toward the metallic fibre disk 661. In other words, torque convertor 640 is formed of two half cylinders 644 and 646 coupled by fasteners 652. The torque convertor comprises top and bottom disks 666 and 668. The bottom disk 668 has splines 692 and a center pilot bearing 802, the top disk 666 has only one spline 692. Further, there is one disk 661 with metallic fibre material on both sides thereof and having center pilot shaft 696 pressed into the metal disk 661.

The disk 660 has a center bearing surrounding the shaft 12 extending from the drums 666. The engagement of drums 666 and 668 and disk 660 provides a smooth automatic lock-up of the motor 12 and the supplemental drive shaft 642. To disengage the drums 666 and 668 and the disk 660, an exhaust port modulating valve 676 opens thereby releasing the pressure from the sealed diaphragm for releasing the drums 666 and 668 from the disk to disengage the motor 12 and shaft 642.

The motor 10 may further include a first flywheel 682 on the drive shaft 12 and a second flywheel 684 on the supplemental shaft 642. The torque convertor 640 is adapted to effect the coupling and releasing of the supplemental shaft 642 and second flywheel 684 with respect to the first drive shaft 12 and the flywheel. At a predetermined RPM of the rotor 16, the torque convertor 640 will disengage the drive shaft 12 from the supplemental shaft 642.

The air torque convertor 640 connects the supplemental drive shaft 642 to the drive shaft 12. The torque convertor 640 is an air actuated torque convertor. The master computer 700 will direct air pressure from the forward/reserve selector 448 through a modulating valve 686 to both sides of the torque convertor 640 thereby moving the disks 666 and 668 against a metallic fibre disc 660 between them at a predetermined RPM. This arrangement smoothly engages the supplemental shaft 642 to the drive shaft 12. To disengage the torque convertor 640, the master computer will exhaust pressure from the torque convertor to ambient thus releasing the disks 666 and 668 from against the metallic fibre disk 660. Further, selecting neutral on the forward/reverse selector 448 will quickly disengage the torque convertor.

With the tanks 100, 102 and 104 pressurized as mentioned above and a start switch 604 in the on position, the master computer 700 and a monitor 702 give a read out indicating the condition of the various controls. After a determination has been made that all systems are in proper working order, a variable speed foot controller 606 and a forward/reverse selector 448 are used to control the demand for power, which, in turn activate the high pressure forward modulating valve 444 and the low pressure forward modulating valve 446 to transfer pressure from the high pressure tank 104 and low pressure tank 100 to their respective manifolds 74 and 80 and injector nozzles 64 to rotate the rotor 16.

When the rotor 16 reaches a predetermined RPM, the torque convertor 640 will engage the drive shaft 12 to move the vehicle forward. As rotor 16 RPM increases to a predetermined value, the master computer 700 modulates the high pressure line 422. The high pressure line 422 is closed when no acceleration forces are required. The low pressure lines 418 continues to power the rotor 16 until acceleration of the vehicle is required, at which time the high pressure line is opened. The high pressure modulating valve 444 is opened by a foot pedal 606 position corresponding to acceleration of the vehicle to supplement the low pressure air flow.

As the rotor 16 slows to a predetermined RPM, the torque convertor 640 disengages the drive shaft 12. Conventional vehicular brakes 650 are utilized in conjunction with rotor 16 reversing to slow the vehicle. When the torque convertor 640 has disengaged, the master computer 700 senses the disengagement and closes the reverse modulating valve 450. When the vehicle comes to a stop, the forward/reverse selector 448 may be positioned to move the vehicle in a reverse direction. With the forward/reverse selector 448 in the reverse position, the master computer 700 opens the low pressure reverse modulating control valve 440. The amount of air flow is controlled by the amount of movement of the variable speed foot controller. Air pressure is directed from tank 102 through the forward/reverse selector valve 448 to the reverse manifold 82 and nozzles 64 to reverse the direction of the rotor 16. At a predetermined speed of the drive shaft 12, the torque convertor 640 will engage, moving the vehicle in a reverse direction. To stop the reverse movement, the forward/reverse selector 448 is moved to the neutral or forward position.

The inertia veined flywheel 682 is located on the drive shaft 12. The flywheel's 682 purpose is to store and deliver inertia energy to the supplemental shaft 642. The flywheel also acts as a cooling fan. A shroud, not shown, is incorporated around the flywheel 682 to direct ambient air for cooling. The shroud is fastened to the exterior of the motor housing 14 for directing air across the motor housing, pumps and cooling coil to dissipate any heat that may build up.

The System for Converting Solar Energy Into Mechanical Energy

More specifically, the system 618 comprises an alternator 610 and/or a battery 612 chargeable through solar panels 614 to generate power for the reciprocating magnet 210 to thereby generate compressed air. Electrical energy from the batteries is replenished by the solar panels 614 and/or an amperes alternator 610. The alternator 610 may be belt driven from a pulley 616 on the drive shaft 12. The alternator 610 replenishes electrical energy at night, on low sunlight days, or any other time where there is a need for recharging.

The Pump

Figure 3:
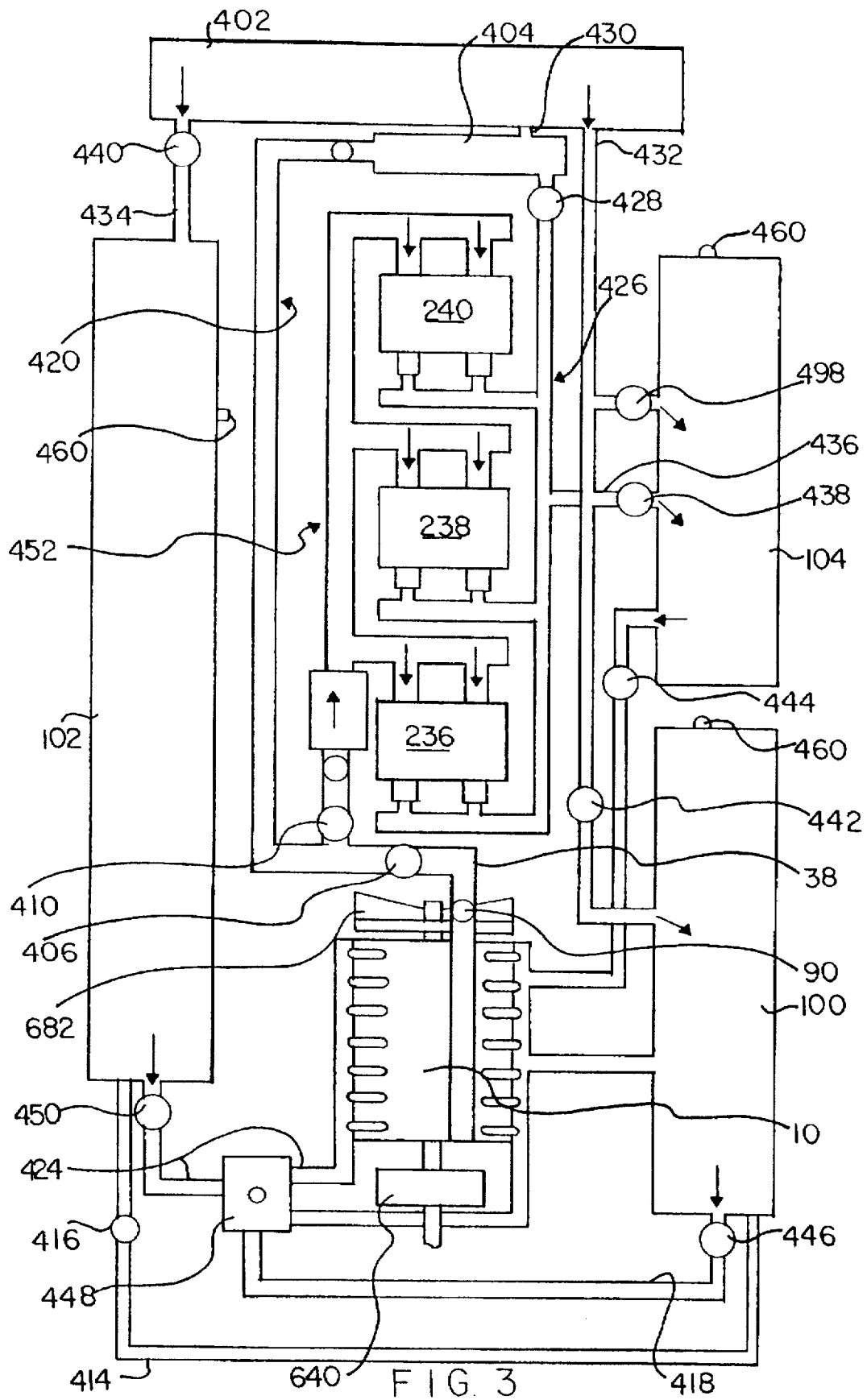
FIG. 3 is an enlarged plan view of the invention.
Figure 5:
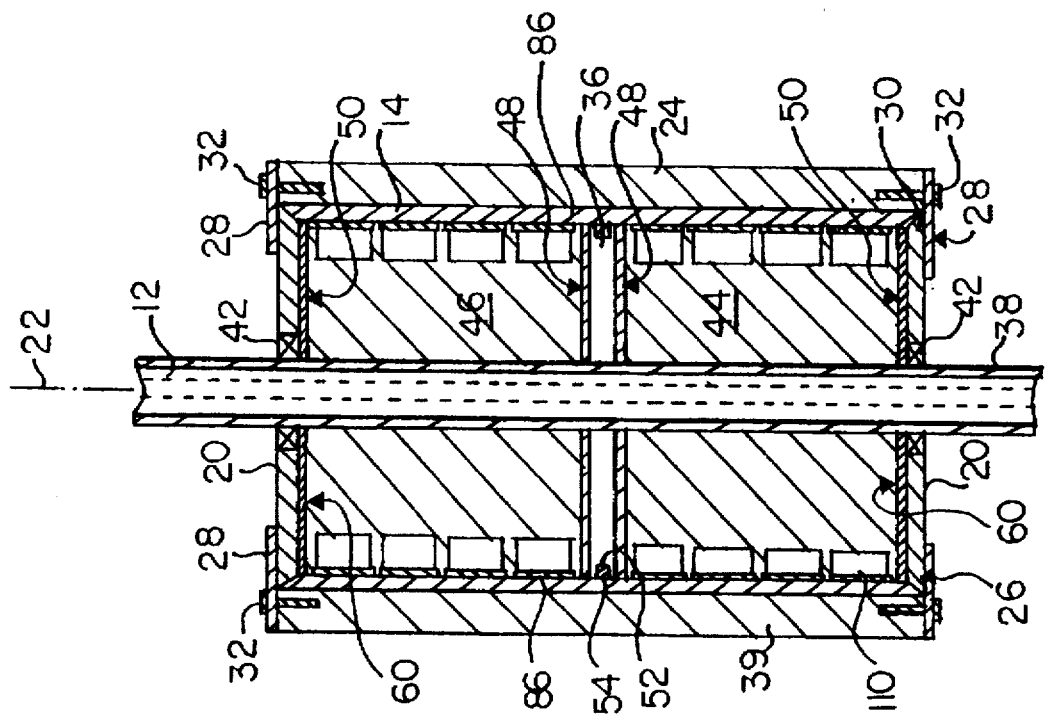
FIG. 5 is a vertical section through the motor housing showing the rotor and drive shaft.
Figure 4:
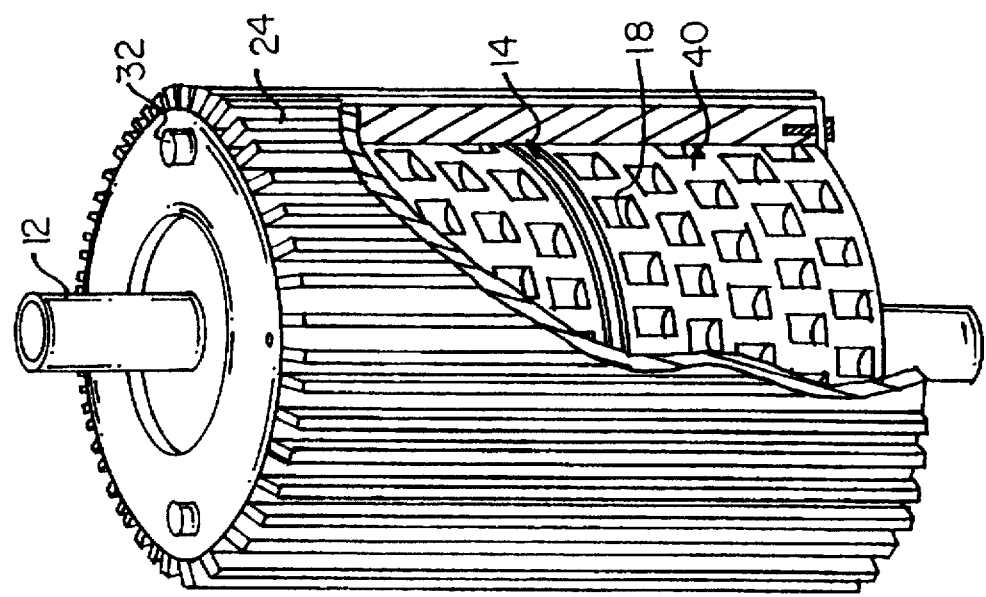
FIG. 4 is a perspective section through the motor housing showing the rotor therein.

More specifically, the system includes a pump 200. The pump 200 has a pump housing 202, a cylindrical magnetic piston 210, resilient members 220, a primary wire 232, a secondary wire 234 and a source of potential 612 for generating electrical current. The pump 200 may be one pump as shown in FIG. 2 or a plurality of pumps as shown in FIG. 3. The number of pumps is determined by the power requirement of a vehicle equipped with the invention.

Where a plurality of pumps 200 are used, all the pumps may operate in the same manner. However a plurality of pumps 200 may be utilized having one pump 236 provide air volume, a subsequent pump 238 provide air pressure and a final pump 240 provide air flow. Any one or more of such pumps may be utilized as a function of the particular application.

The Pump Housing

The pump 200 has a cylindrical housing 202 having a circular cross-section and opposed planar faces 218 and 246. Additionally, the pump housing 202 has cooling fins 230 on the exterior of the pump housing 202. The fins 230 extend radially from the housing and are located longitudinally along the pump housing 202 between end plates 216 and 248. The fins function to remove heat from the pump housing. The housing 202 is made of a light weight heat dissipating material. Preferably, the pump housing 202 is formed of aluminum. Other suitable materials include a ceramic material, glass, duralumin, teflon, pyrographit or the like. The interior surface 242 of the pump housing is also preferably coated with a low friction material, such as teflon.

Figure 8:
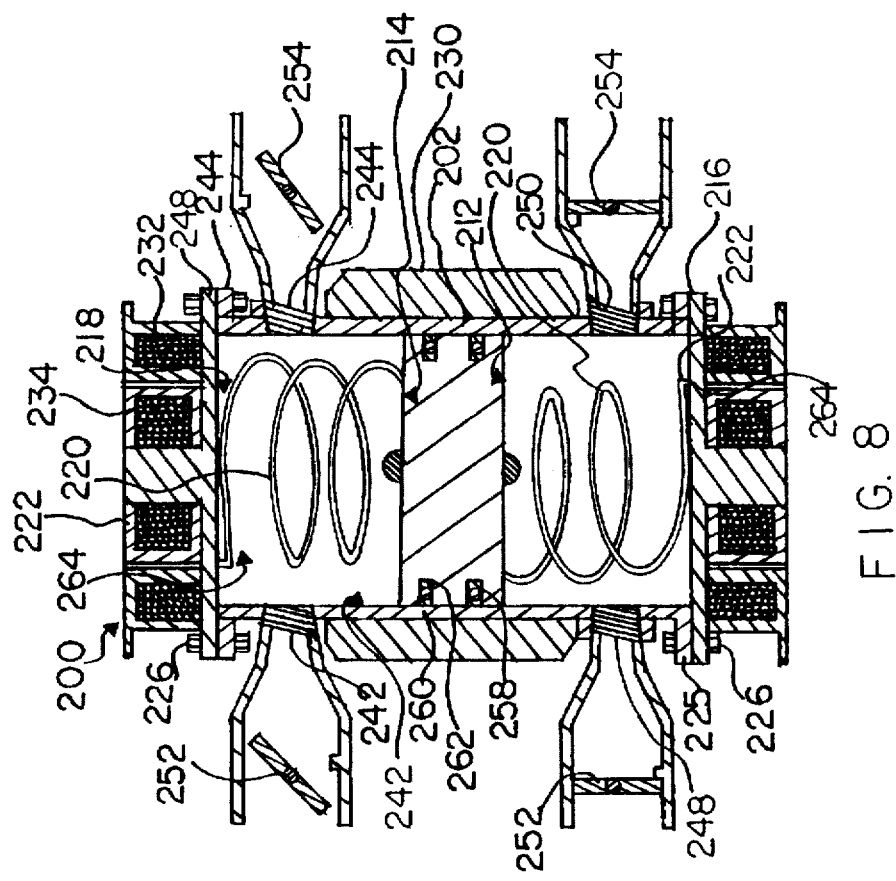
FIG. 8 is a vertical section through the pump showing the magnet and resilient members.
Figure 7:
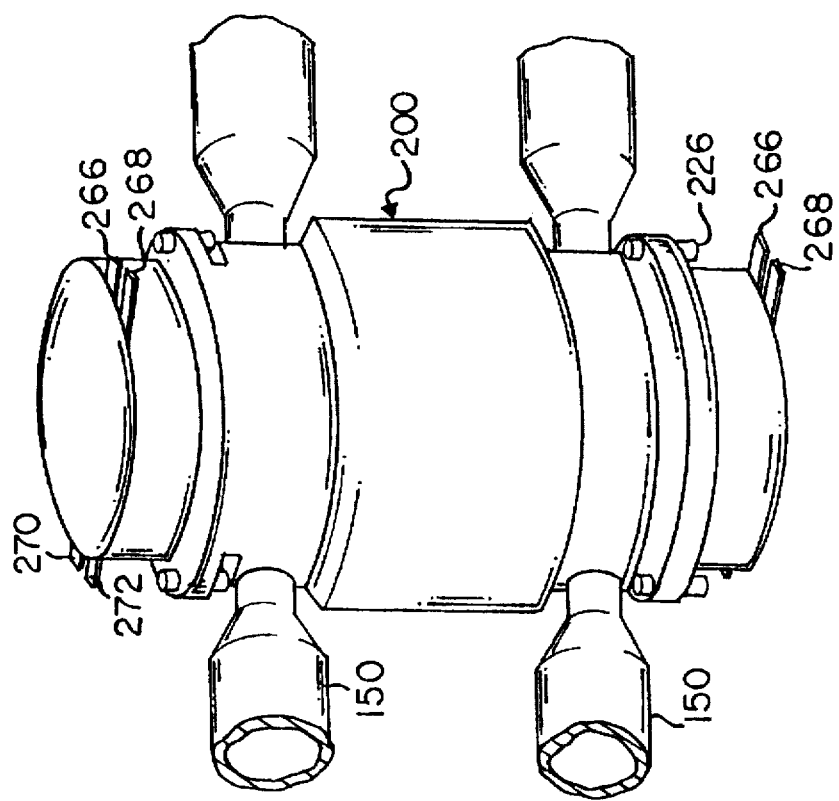
FIG. 7 is a perspective view of the pump showing the injector ports.
Figure 7A:
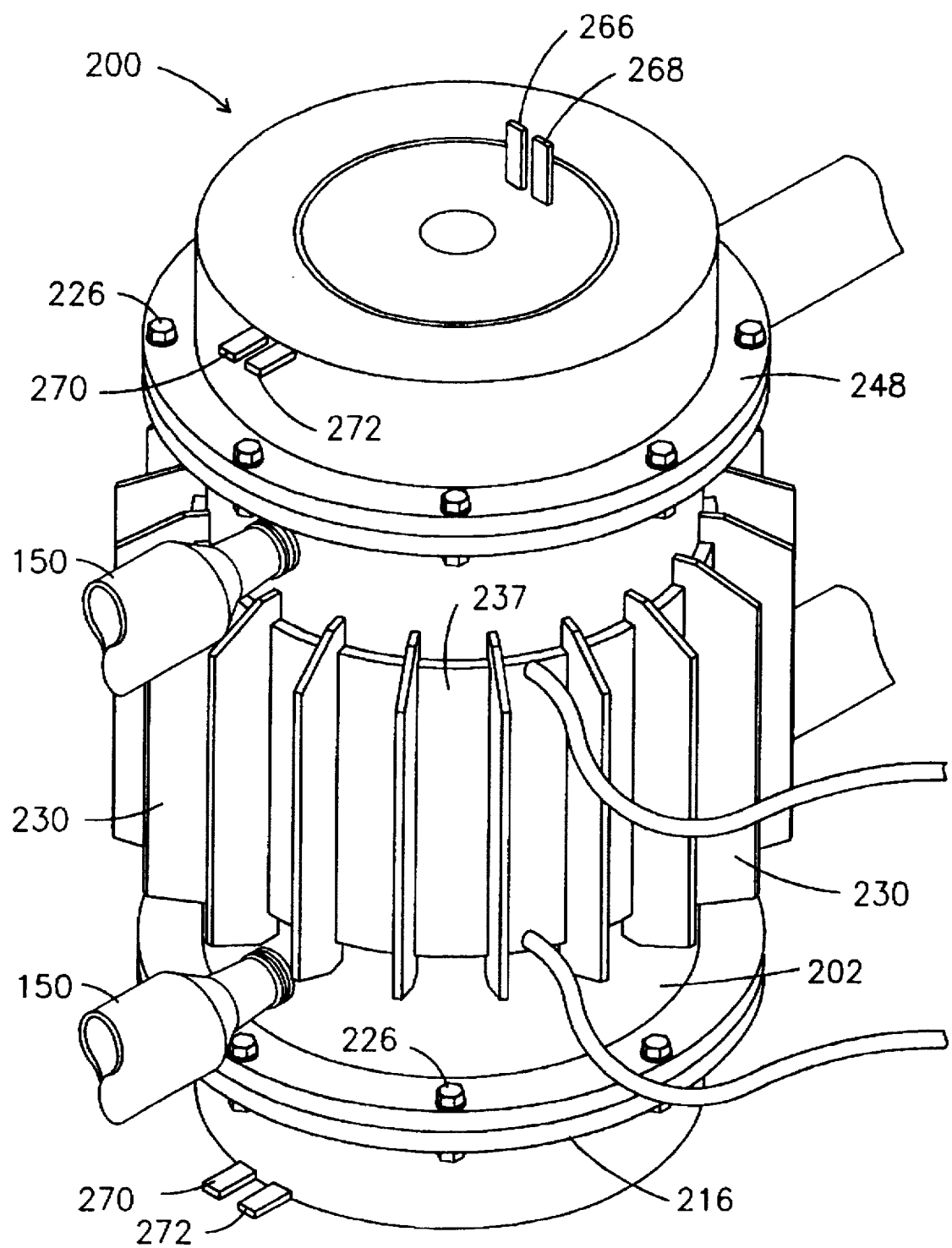
FIG. 7A is a showing similar to FIG. 7 but showing an alternate embodiment of the invention.
Figure 11:
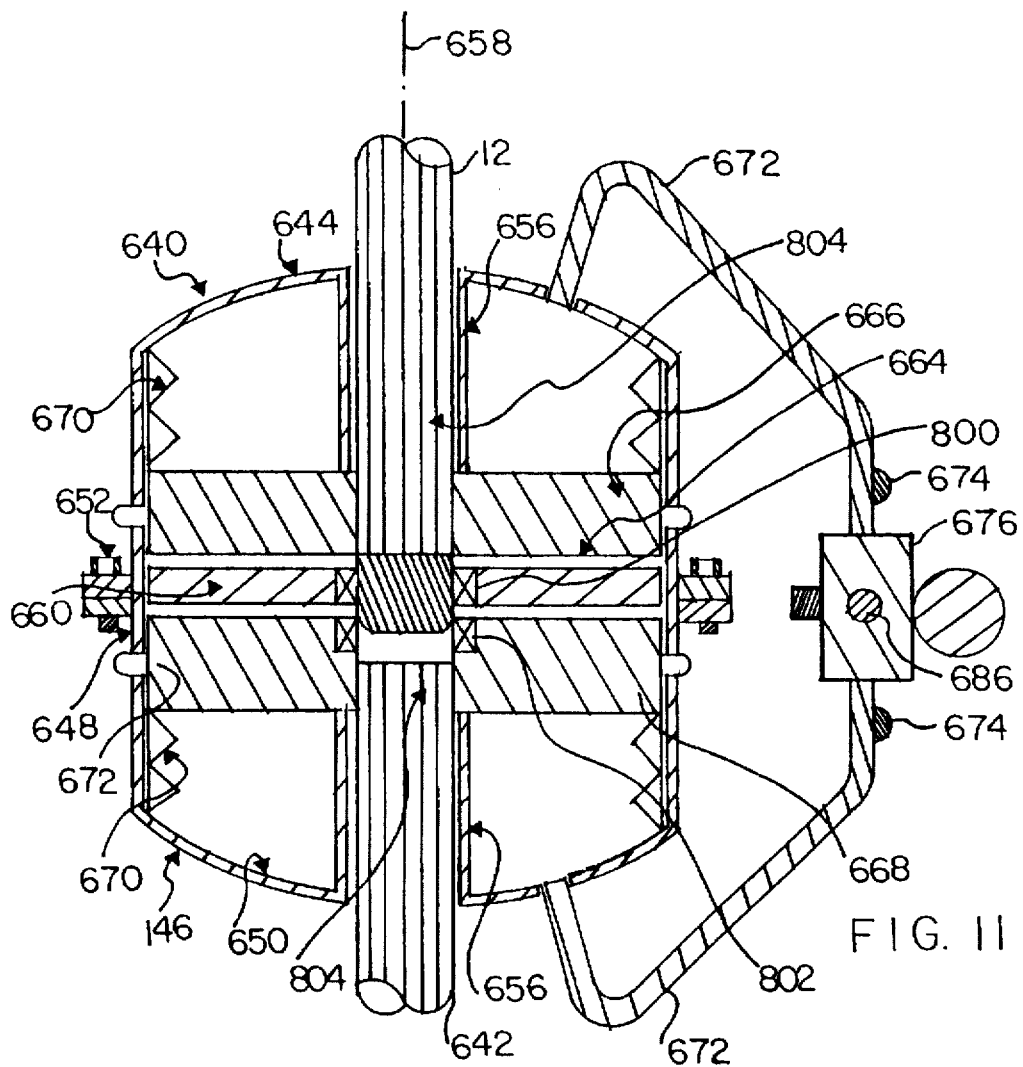
FIG. 11 is a horizontal section through the torque converter.
Figure 12:
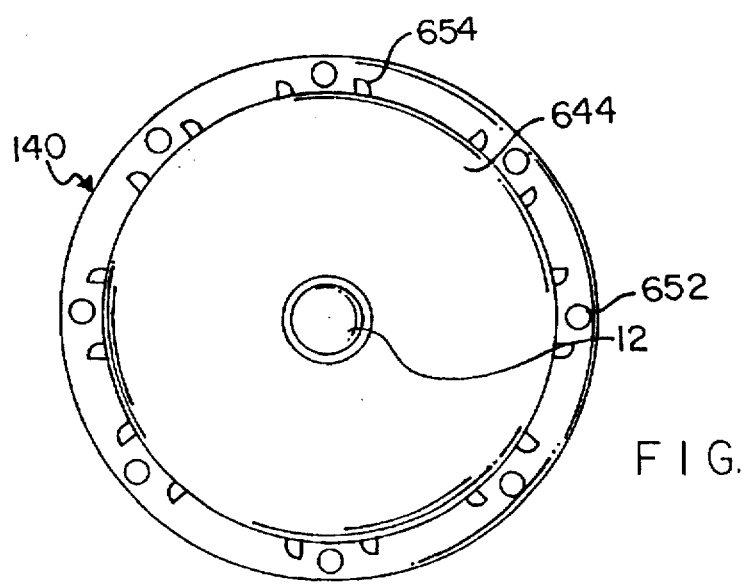
FIG. 12 is an elevational view of the torque convertor.
Figure 13:
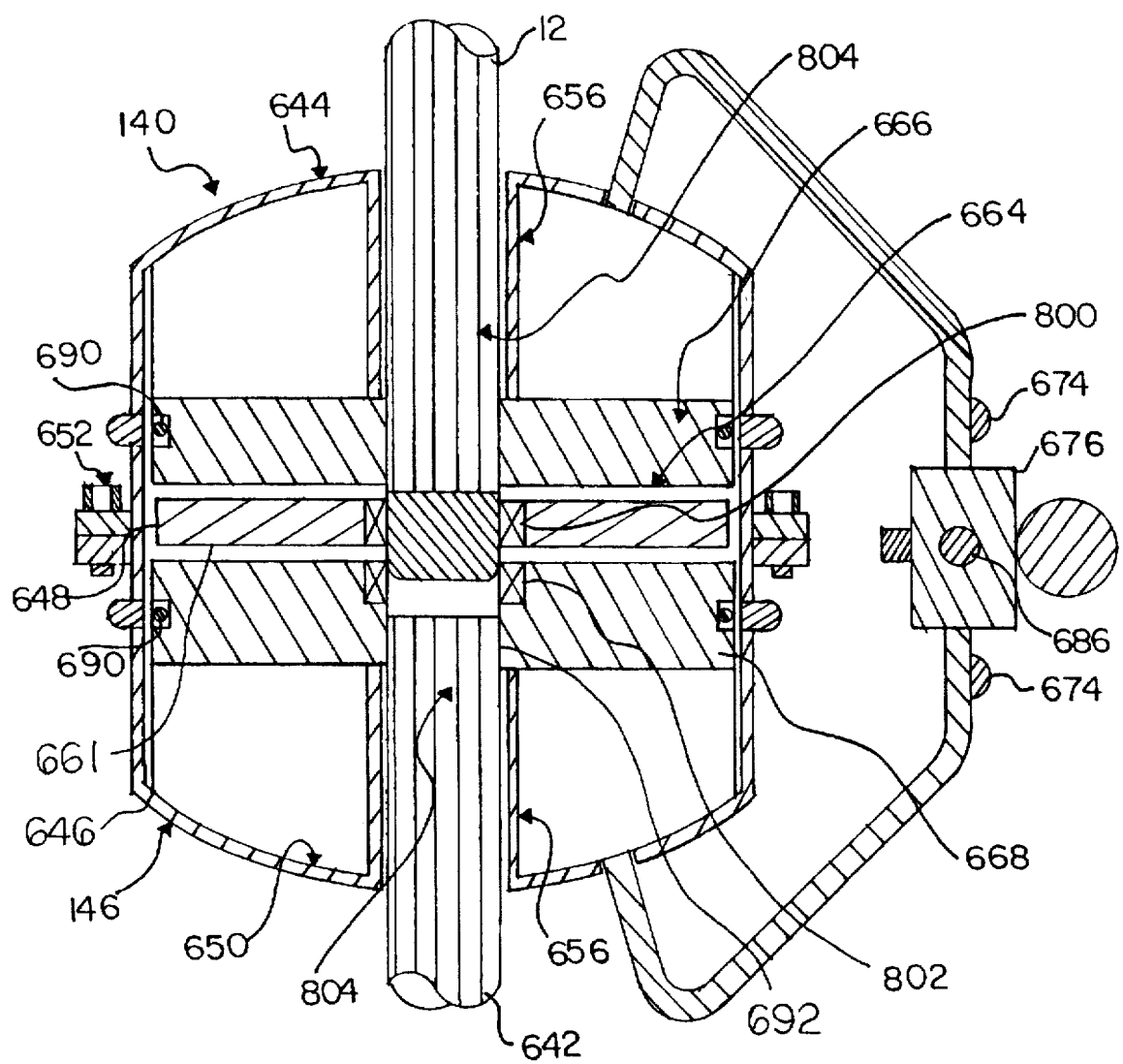
FIG. 13 a cross-section of an alternate embodiment of the torque converter.
Figure 14:
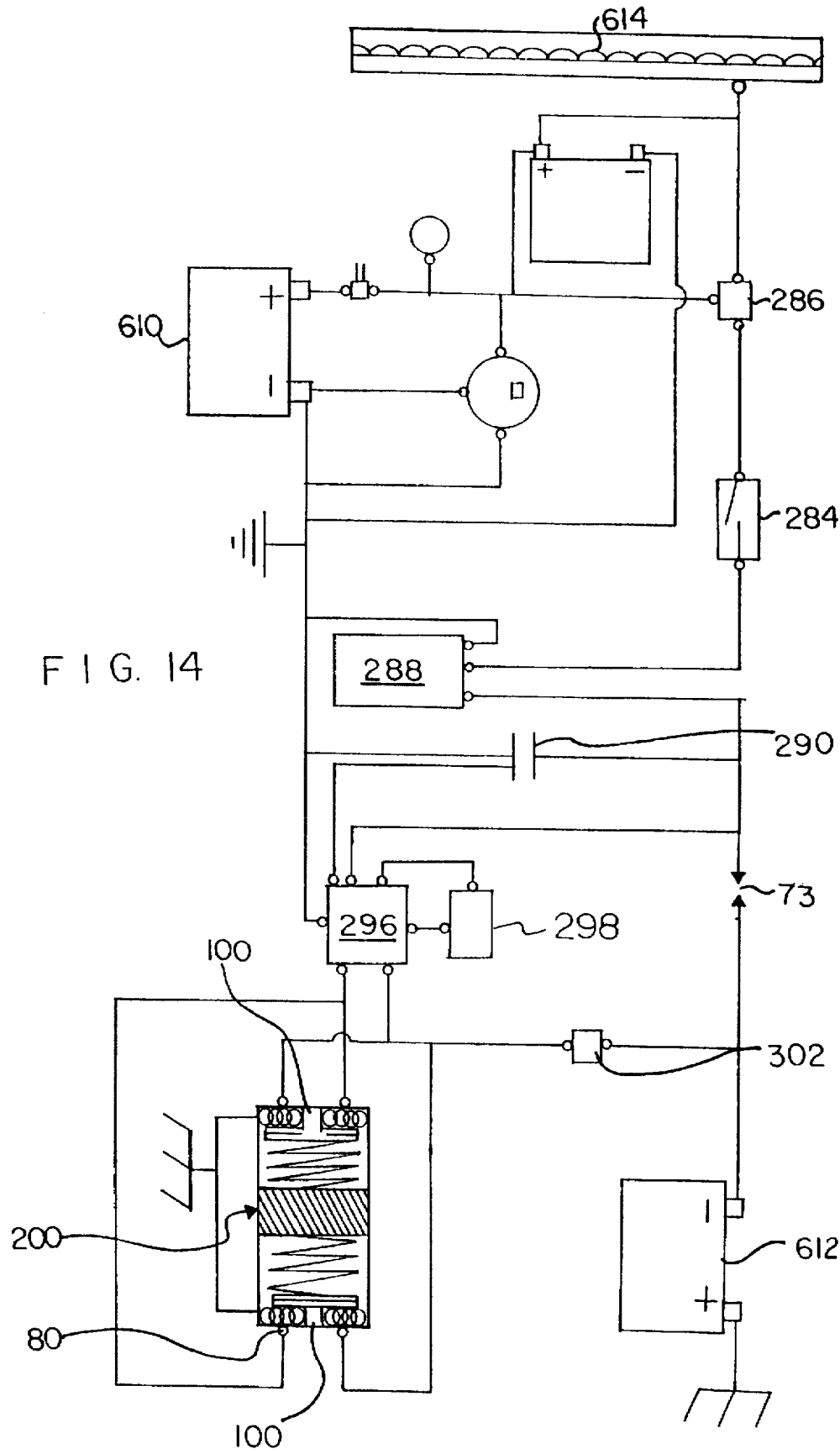
FIG. 14 is an electrical schematic of the invention.
Figure 18:
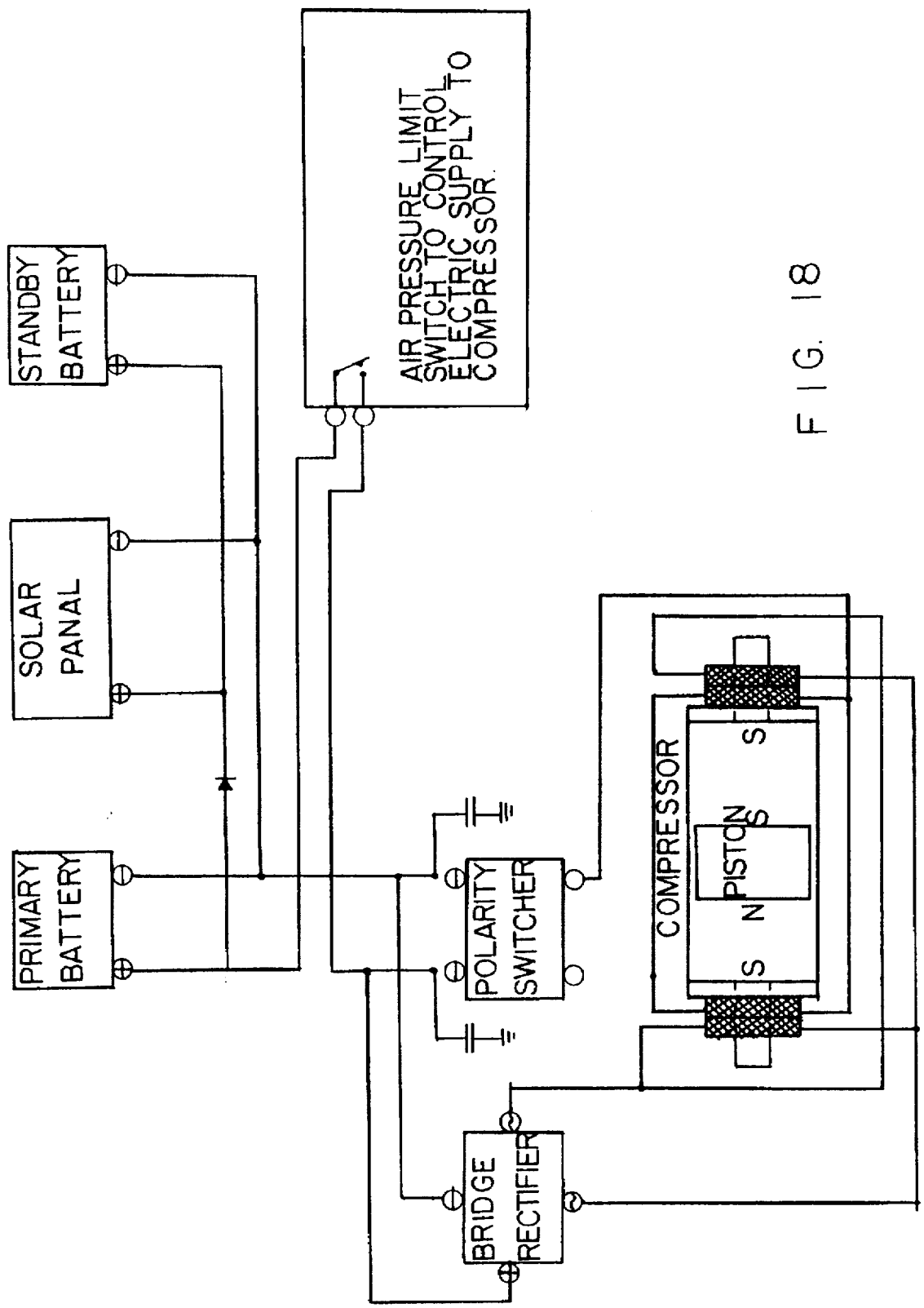
FIG. 18 is an electrical schematic of the electrical pump and associated controls.

Furthermore, the pump housing 202 has end plates 216 and 268 functioning as a magnet and at each end 218 and 268 of the pump housing 202 is a drilled flange 244 to couple the end plates 216 and 248 and the pump housing 202 in an air tight relationship. The end plate may be a permanent magnet, a magnet created by current flowing through coils, or a combination thereof as shown in FIGS. 8, 14 and 18. Fasteners 226 removably couple the pump housing 202 and end plates 216 and 248. A gasket 228 is located therebetween. The end plates 216 and 248 are coupled to the pump housing 202 through the gaskets to form an air tight chamber. The end plates 216 and 248 are made of a light weight heat dissipating magnetic material. The interior of the housing is preferably coated with a lubricous material such as teflon to reduce friction.

The pump 200 further includes a plurality of ports 242, 244, 248 and 250. Preferably, there are four ports within the pump housing 202. An upper and lower intake port 242 and 248 and an upper and lower exhaust port 244 and 250. One intake and one exhaust port are located near each end 218 and 246 of the pump housing 202. Each port 242 is positioned 180 degrees apart with respect to the other port 244. An intake port 248 and exhaust port 250 are thus positioned at the opposite ends 246 of the pump housing 202. Input ports 242 and 248 and output ports 244 and 250 each have an intake check valve 252 and exhaust check valve 254 coupled to them respectively. The check valves 252 and 254 open and close as a result of either pressure differentials thereadjacent or in response to a master computer controller.

The Cylindrical Magnet

The cylindrical magnet 210 has a circular cross-section and opposed parallel planar faces 212 and 214. The axis of the pump housing 202 and the magnet 210 are coextensive. Furthermore, the magnet has two machined grooves 258 therein on its exterior surface 260 along the circumference thereof. The grooves 258 receive O-rings 262 made of low friction material, such as teflon. The O-rings form a seal between the magnet 210 and the interior surface 242 of the pump housing 202 as the magnet moves along the housing's interior surface. The magnet 210 is preferably made of a ferrox plana class material, such as "Ferroxdure" or "Vectolite." It may, however, be made of any magnetic material. Furthermore, the magnet is permanently magnetized.

The Resilient Members

The resilient members 220, preferably coil springs, are coupled by fasteners 264 at their external ends 222 to the end plates 216 and 248 and at their internal ends to the planar faces 212 of the magnet 210. The resilient members stabilize the magnet within the housing 202. The members 220 also provide cushion for the magnet at its end of travel.

The Primary Wire, Secondary Wire and Source of Potential Electrical Energy

The pump 200 includes a primary wire 232, a field coil, adapted to initiate reciprocation of the magnet 210 within the pump housing 202. The primary wire 232 is coupled to a source of potential electrical energy 612, a battery, the primary wire is wound with opposite ends 266 and 268 adjacent to the faces 218 and 246 of the pump housing 202 for being intersected by the ends 212 and 214 of the magnet when reciprocating. The pump further includes a secondary wire 234, a field coil. This wire is wound oppositely from the primary wire 232. It has opposite ends 270 and 272 adjacent to the faces 246 of the pump housing 202. These wires are for being intersected by the ends 212 and 214 of the magnet 210 when reciprocating for thereby generating current for use.

In other words, contained within each end plate 216 and 248 is an electromagnetic field coil 232 and 234 of copper windings having a magnet core head and a stator magnetic pickup. The field coils are wound in opposite directions from each other around the magnetic core. A positive terminal 266 and 270 and negative terminal 268 and 272 are located on each field coil end plate 216 and 248. The terminals allow for electrical feed and discharge returning to a battery for storage.

Electrical energy is provided by a battery 612. It may also be provided by the alternator 610. The battery is preferably charged by a solar receiver 614 and/or an amperes alternator 610. D.C. current for operating the pump 200 is supplied by the battery 612 through wires 280 containing an on/off switch connected to a computerized controller 286. Alternately, A.C. current may power the pump. The controller 700 distributes current to a pulsating switching device 284 for energizing an automotive coil 288 thereby stepping up the current as it passes through the coil. The stepped up current flows to a capacitor rectifier diode 290 to boost the voltage of the current and store the current momentarily. The high voltage then flows to the master computer 700 which functions to synchronize current flow to the electromagnetic field coils 232 and 234 at each end 246 of the pump housing 202 in sequence to attract the magnet 210. As the magnet moves toward the field coil 232 and 234, air within the pump housing 202 is compressed and forced out through the exhaust port check valves 256 and 244.

Furthermore, there is a breaker-less, pulse-triggered transistor control system within the master computer 700. The magnetic pickup coil assembly, a stator, is positioned within each electromagnetic field coils 232 and 234. As the magnet 210 nears the magnetic pickup coil assembly 294, an electrical signal is generated within the magnetic pickup coil assembly 232 and 234. When the magnet reaches a predetermined position inside the pump housing 202, it creates a magnetic alignment and a zero signal is generated in the pickup coil.

The zero signal is neither negative nor positive, rather the signal acts similar to a break in the circuit. The zero signal is transmitted to an externally mounted electronic amplifier module 296. The module breaks the primary circuit, causing an arc to the battery 612. As the magnet 210 moves away from the discharged electromagnetic field coil 232 and 234 signal having opposite polarity is generated when the primary circuit breaks. Thereafter, an electronic timing circuit in the module 248 inside the master computer 700 is activated. The timing circuit breaks the primary current. This permits the arc over to the battery 612. In case of a misfire, there is a safety circuit 300 which goes through the computer 700 and safety controller 302. The misfire is diverted to the battery 610. Thereafter, the module 298 in the computer reconnects the primary circuit to allow it to build current to arc over again, sending the arc to the battery 612.

This sequence of events subsequently occurs in the opposite end 218 of the pump housing 202 and thereby draws air in through the intake check valve 248 located on the back side 212 of the magnet 210. Compressed air is simultaneously pushed out on the front side 214 of the magnet 210. The process is repeated in a reciprocating motion, thereby creating air pressure to be routed to storage tanks 100, 102 and 104. The pump 200 draws a minimum amount of electrical energy thereby allowing an electrical recovery of any surplus electricity generated to be directed to the battery 612.

The electric pump is perhaps best understood by reference to FIGS. 8, 14 and 18. As can be seen, the primary windings are wound at opposite ends of the housing with such opposite ends connected in series. There is one wire in the primary windings with two ends and two leads coupled to a power source, the battery. The primary wires function to send D.C. current to and from the windings alternately at each housing end, one wound right hand, the other wound left hand. In this manner, fields are generated and thereby sustain the movement of the magnetic piston 210. Efficiency is increased by opening the winding support to place the winding wires in facing contact with the fixed magnet 216 for intensifying the fields which effect movement of the magnetic piston 210.

The secondary windings are also wound at opposite ends of the housing with such opposite ends also connected in series. The secondary windings are radially inward of the primary windings. There is again one wire in the secondary windings with two ends and two leads. Both leads are coupled to the bridge rectifier for carrying A.C. current to the bridge rectifier for creating D.C. current which is carried back to the battery. The housing for the secondary windings is open radially internally so that the secondary wires are in contact with a cylindrical post of the fixed magnet 248. This maximizes efficiency of the fields in restoring electrical energy to the battery. The axially interior cylindrical plate of the magnet 248 in conjunction with its unitary cylindrical post constitute a transformer.

The battery energizes the primary windings with D.C. current alternately due to the incorporation of a polarity switcher. A.C. current is created in the secondary windings which is converted to D.C. prior to regenerating the battery due to the incorporation of the bridge rectifier.

A solar panel is in parallel with the battery to constitute a secondary power source to the battery. A standby battery is also provided for a similar purpose. An air pressure limit switch functions to control electric supply to the compressor.

An alternate embodiment of the device is shown in FIGS. 8A and 8B. In such alternate embodiment, a supplemental coil of wire 235 is wrapped around the exterior surface of the housing interior of the fins. Such supplemental wire has its end coupled to an electrical component to receive and store created current. In this manner, when the magnet in the form of a piston is reciprocated within the housing, it will make and break magnetic lines of flux and thereby induce a flow of current within the wires of the supplemental component. In this embodiment, the movement of the magnet is used for the supplemental purpose of generating additional current extending the utility of the device beyond that of the utility in the primary embodiment. In this manner, the mechanical movement of the piston is being used to create electricity through the supplemental wires as well as the wires at the ends of the housing. Such capabilities is true of the embodiments of FIGS. 8, 14 and 18 as well as 8A and 8B. Note also that the FIG. 18 embodiment eliminates the springs in contact with the piston. Such is possible in any embodiment where the magnets at the ends of the housing facing the piston are of like polarity.

The Master Computer

To monitor the invention, a computerized visual read-out 702 is provided. The readout informs the operator of the condition of the system's components and gives diagnostic information for any defect or malfunction in the apparatus. Diagnostic information comes from the master computer 700. A wiring harness 704 couples the valves within the line system 400, pumps 200, and sensors 438 to the master computer 700.

ALTERNATE EMBODIMENTS OF THE INVENTION

An alternate embodiment of the invention uses an accumulator 102. The accumulator 102 may be a simple pressure resistant tank. The accumulator drives the rotor 16 for liquid actuation of fluid pressure to the rotor cups 18. The exhaust manifold 38 is reduced in size and separated from the pump 200 when compared to an apparatus operated by air pressure. The discharge of the fluid from the motor housing 14 is returned back to the pressurized holding tank of the accumulator 102. The fluid accumulator system can actuate the torque convertor 640 in the same manner described above via fluid pressure.

Separation of the pump 200 from motor 10 is a further alternate embodiment of the invention which can make it more useful in some applications.

In other words, the accumulator 102 (not shown) is essentially a fluid holding tank. A liquid therein is pressurized by the pump 200. The accumulator is a separate pressurized system. The power source to the rotor 16 is the fluid pressure created by passing the pressurized fluid through the motor 10 for turning the rotor as described above.

Figure 15:
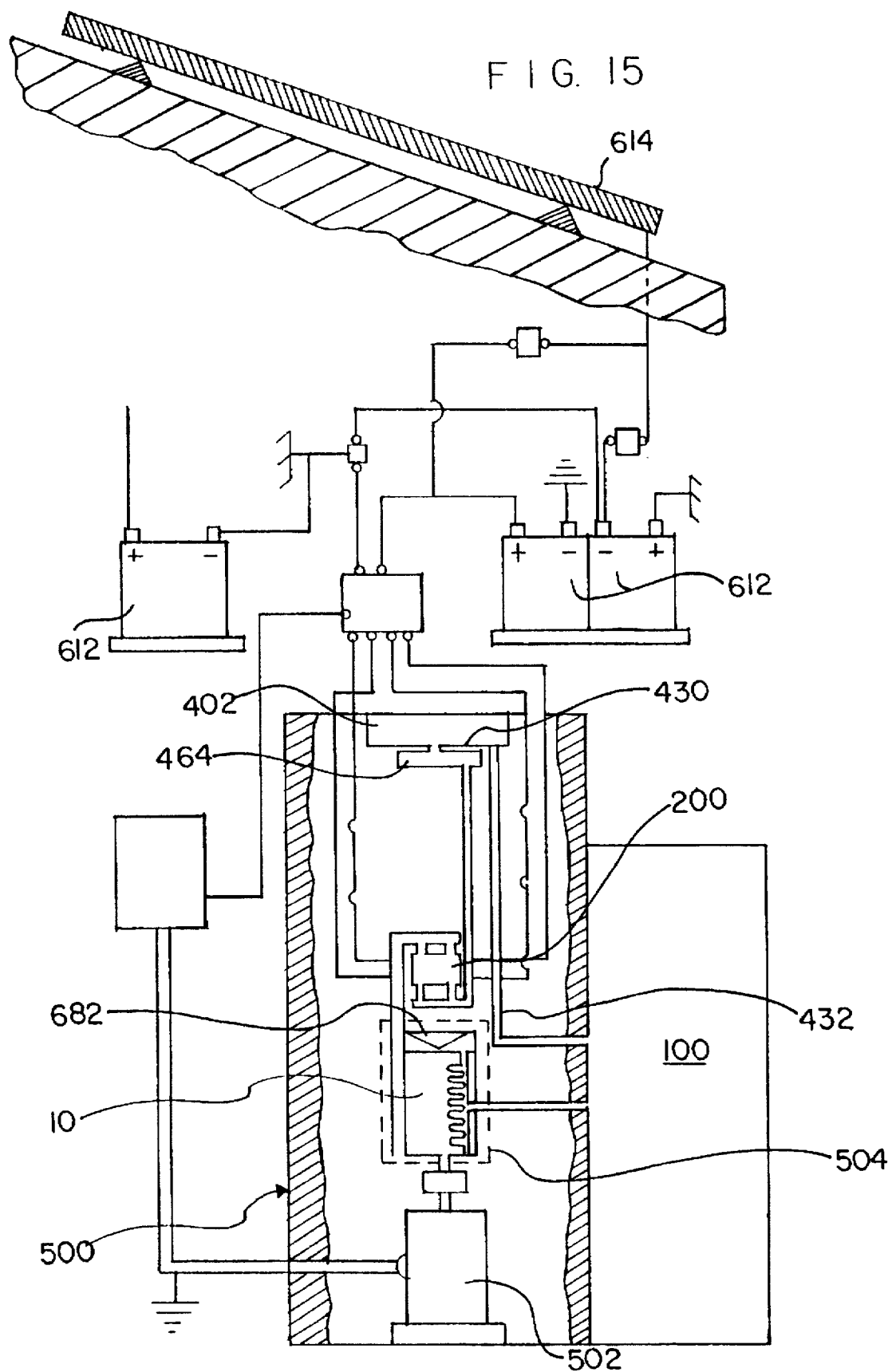
FIG. 15 is a schematic sectional view of an alternate embodiment of the invention having a power generating plant within a building.
Figure 16:
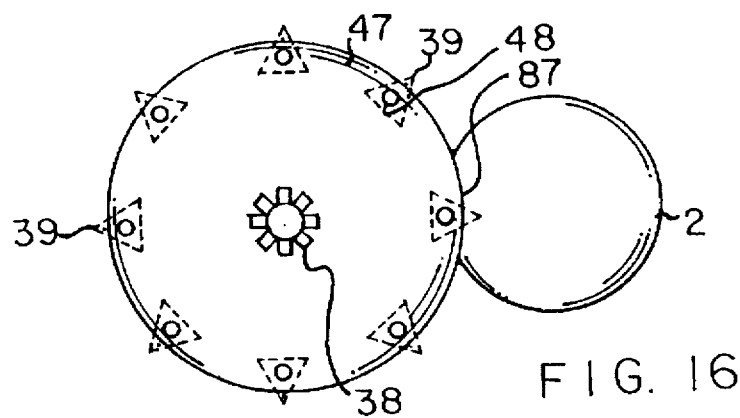
FIG. 16 is an elevational view of the motor housing and manifold.
Figure 17:
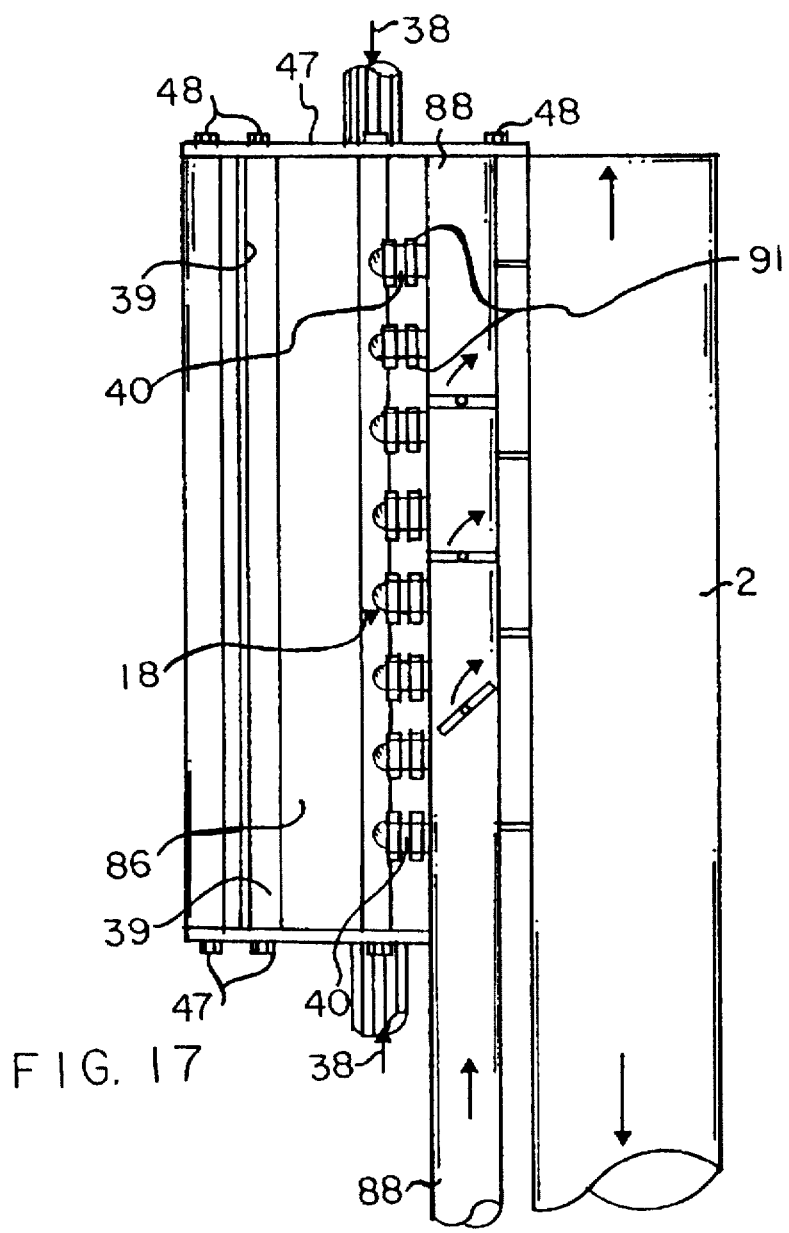
FIG. 17 is a plan view of the motor housing and manifold with parts removed to show certain internal constructions.

Another alternate embodiment of the present invention relates to a stationary power generating plant 500. See FIG. 15. In this alternate embodiment the motor 10 has only one row of nozzles 64. Furthermore, the motor operates at a constant speed and is regulated by the master computer 700 in conjunction with the air pressure modulating valve 446. The pump 200 and motor 10 drive an A.C. generator 502 to generate electrical power. Cooling is effected by blowing ambient air over the veined inertia fly wheel 682 and through a shrouded finned cooling structure 504 surrounding the pump 200. The air pressure storage tanks 100 will be of greater capacity than those utilized in vehicular applications of the invention, as well as larger capacity storage batteries 612.

A further alternate embodiment is a space photovoltaic application (not shown). The alternate embodiment can remove air from the cargo area of a space shuttle before the cargo hatch is opened. The air can be saved and reused, such as for emergency air pressure within the shuttle's guidance system, emergency breathing air, generating extra electrical power in space, or to operate electrical and pneumatic tools to build a space station, etc.

The present disclosure includes that contained in the appended claims as well as that of the foregoing description. Although this invention has been described in its preferred forms with a certain degree of particularity, it is understood that the present disclosure of the preferred form has been made only by way of example and numerous changes in the details of construction and combination and arrangement of parts may be resorted to without departing from the spirit and scope of the invention.

Now that the invention has been described,

What is claimed is:

1. Apparatus for generating air flows from electrical current comprising:

a cylindrical pump housing having a circular cross section and opposed faces;

a permanent magnet reciprocally located within the housing formed as a piston with opposed faces, the axes of the housing and the magnet being coextensive;

a pair of resilient means coupled at their external ends to the faces of the housing and at their internal ends to the faces of the permanent magnet;

a primary coil wire wound so as to generate current flow for establishing a primary field current and adapted to initiate and maintain reciprocation of the permanent magnet within the housing, the primary coil wire being coupled to a source of potential with its opposite ends adjacent to the opposed faces of the housing for constituting electromagnets with their fields adapted to be intersected by the ends of the permanent magnet when reciprocating; and a secondary coil wire wound so as to generate correct current flow for establishing a secondary field of current adapted to maintain reciprocation of the permanent magnet within the housing, with opposite ends of the permanent magnet adjacent to the opposed faces of the housing for being intersected by the lines of force at the ends of the permanent magnet when reciprocating for thereby generating pressure differentials within the housing during such reciprocation.

2. The apparatus as set forth in claim 1 and further including a magnet fixed at each end of the housing shaped as a plate in contact with the coil wires.

3. The apparatus as set forth in claim 1 wherein the coils are spaced radially.

4. The apparatus as set forth in claim 3 and further including a post formed integrally with the plate in contact with the secondary coil wire.

5. A system for converting electrical energy into mechanical energy comprising:

a reservoir for fluid under pressure;

a motor adapted to rotate a shaft in a motor housing through the application of fluid under pressure from the reservoir into the housing through interchangeable orifice nozzles;

lines coupling the reservoir and motor for the flow of fluid to the motor from the reservoir when functioning in a first mode and for the flow of fluid from the motor to the reservoir when functioning in a second mode;

pressure generating means to generate fluid under pressure for introduction into the reservoir; and electrical means to generate power for reciprocating magnet means to thereby generate the fluid under pressure.

6. A machine comprised of an electromagnetic, double-action, positive displacement, free floating cylindrical magnet within a cylinder having axially spaced driving components and a circumferentially located coil, the magnet being axially between the driving components and radially within the coil, and check valves for intake and exhaust; wherein the electrical circuit is comprised of a DC computerized programmed electric circuit supplying electromagnetic coils which are mounted on each end of the cylinder by means of fasteners, these coils of wire being wound so as to generate correct current flow for establishing a primary field of pulsating DC current around a ferro plana class elongated material and all metals similar in this class, whereby when electrically energized this magnet class has strong magnetic attraction to like material such as the magnet in the cylinder; and a secondary coil which when the piston is located in alignment with the electromagnetic coil creates electrical energy recovery which is returned to the battery.

7. An apparatus for the generation of useful mechanical work in the form of rotary shaft power that can be utilized by any device requiring rotary power comprising:

a base for mounting components wherein the components include:

an independent electrical source to supply electric power to the electrical operating and control components of the apparatus;

an electromagnetically operated piston pump, deriving operating power from the electrical source and capable of pumping fluid under pressure, and having the ability to partially recover and return expended electrical power to the electrical source;

a plurality of storage tanks wherein the output of the pump is transferred and held under pressure, and wherein the stored pressurized contents of the storage tanks are transferred;

a turbine for receiving the contents of the storage tanks and having the pressurized contents inlet port terminating in a header with a plurality of interchangeable speed controlling discharge orifices through a plurality of shaft mounted balanced turbine impellers, causing the impellers to revolve and, in turn, causing the shaft to revolve and produce useful mechanical power, and having the contents exit the turbine, at a lower pressure, via the turbine discharge port and transfer back to said pump inlet port for recycling;

the shaft ends extend beyond the turbine housing a distance sufficiently long enough on one end to couple to auxiliary associated equipment and long enough on the other end to permit a flywheel to be mounted on the shaft between the turbine housing and the load.

8. A machine comprised of an electromagnetic, double-action, positive displacement, free floating cylindrical magnet within a cylinder having axially spaced driving components and a circumferentially located coil, the magnet being axially between the driving components and radially within the coil, and check valves for intake and exhaust wherein said free floating magnet is comprised of ferro plana class material, O-ring grooves which have essentially frictionless O-rings attach on each end of the magnet that seal compression in a cylinder; and a resilient member made from a strong friction coated lightweight material to help stabilize the magnet recoil without piston impact help the reciprocating action, along with making it quiet and protecting the magnet from the magnet recoil without piston impact help the reciprocating action, along with making it quiet and protecting the magnet from impact, these resilient members also keep the passageway open for the intake and exhaust valves mounted in the pump housing and keep the magnet piston centered for easy start of polarity.

9. Apparatus for generating electrical current from mechanical movement comprising:

a cylindrical pump housing having a circular cross section and opposed faces;

a permanent magnet reciprocally located within the housing formed as a piston with opposed faces, the axes of the housing and the magnet being coextensive;

a pair of resilient means coupled at their external ends to the faces of the housing and at their internal ends to the faces of the permanent magnet;

a primary coil wire for constituting an electromagnet with their fields adapted to be intersected by the ends of the permanent magnet when reciprocating for generating electrical current; and a secondary coil wire for constituting an electro magnet for being intersected by the lines of force at the ends of the permanent magnet when reciprocating for thereby generating electrical current.

10. The apparatus as set forth in claim 9 and further including supplemental wires around the housing for generating electrical current when the permanent magnet is reciprocated.

11. Apparatus comprising:

a cylindrical pump housing having a cylindrical side wall and circular opposed housing faces;

a permanent magnet reciprocally located within the housing formed as a piston with opposed circular piston faces, the axes of the housing and the magnet being coextensive;

a primary coil wire at each end of the housing with the piston faces and housing faces therebetween;

a secondary coil wire at each end of the housing with the piston faces and housing faces therebetween, the coil wires and magnet adapted for being intersected by the magnetic lines of force during reciprocation of the magnet.

12. The apparatus as set forth in claim 11 and further including a magnet fixed at each end of the housing shaped as a plate in contact with the coil wires.

13. The apparatus as set forth in claim 11 wherein the coils are spaced radially.

14. The apparatus as set forth in claim 13 and further including a post formed integrally with the plate in contact with the secondary coil wire.

15. The apparatus as set forth in claim 11 wherein the coils are spaced.

* * * * *